US012806918B2

(12) United States Patent
Seki

(10) Patent No.: US 12,806,918 B2
(45) Date of Patent: Nov. 24, 2026

(54) DEFECTIVE NOZZLE ESTIMATION DEVICE, DEFECTIVE NOZZLE ESTIMATION METHOD, DEFECTIVE NOZZLE ESTIMATION PROGRAM, PRINTING DEVICE, AND METHOD FOR MANUFACTURING PRINTED MATTER

(71) Applicant: FUJIFILM Corporation, Tokyo (JP)

(72) Inventor: Masaki Seki, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 463 days.

(21) Appl. No.: 18/458,995

(22) Filed: Aug. 30, 2023

(65) Prior Publication Data

US 2023/0406003 A1 Dec. 21, 2023

Related U.S. Application Data

(63) Continuation of application No. PCT/JP2022/008165, filed on Feb. 28, 2022.

(30) Foreign Application Priority Data

Mar. 3, 2021 (JP) ................................ 2021-033396

(51) Int. Cl.
*B41J 2/21* (2006.01)
*B41J 2/045* (2006.01)
(Continued)

(52) U.S. Cl.
CPC ........... *B41J 2/2142* (2013.01); *B41J 2/0451* (2013.01); *B41J 2/04586* (2013.01); *G06T 7/001* (2013.01);
(Continued)

(58) Field of Classification Search
CPC .... B41J 2/2142; B41J 2/0451; B41J 2/04586; B41J 2/2146; B41J 2/2139; B41J 29/393;
(Continued)

(56) References Cited

U.S. PATENT DOCUMENTS 10,105,948 B2 10/2018 Ueshima
2011/0227988 A1* 9/2011 Yamazaki .............. B41J 29/393 358/406

(Continued)

FOREIGN PATENT DOCUMENTS

JP 2013147003 8/2013
JP 2018051846 4/2018

(Continued)

OTHER PUBLICATIONS

"International Search Report (Form PCT/ISA/210) of PCT/JP2022/008165", mailed on Apr. 5, 2022, with English translation thereof, pp. 1-5.

(Continued)

*Primary Examiner* — Lisa Solomon
(74) *Attorney, Agent, or Firm* — JCIPRNET

(57) ABSTRACT

Provided are a defective nozzle estimation device, a defective nozzle estimation method, a defective nozzle estimation program, a printing device, and a method for manufacturing a printed matter, with which a defective nozzle is estimated in a short time. A position of an image defect of a printed matter caused by a defective nozzle in imaging data based on a captured image in which the printed matter is imaged by a scanner is acquired, a first pixel value at the position of the image defect of the imaging data is acquired, a second pixel value at a position corresponding to the position of the image defect of reference data is acquired, and at least one defective nozzle candidate, which is a cause of the image defect of the printed matter, is estimated from the first pixel value and the second pixel value using a learning model.

12 Claims, 20 Drawing Sheets

(51) Int. Cl.

| | |
|---|---|
| ***G06T 7/00*** | (2017.01) |
| ***G06T 7/70*** | (2017.01) |
| ***G06T 7/90*** | (2017.01) |

(52) U.S. Cl.
CPC .................. *G06T 7/70* (2017.01); *G06T 7/90* (2017.01); *G06T 2207/10008* (2013.01); *G06T 2207/10024* (2013.01); *G06T 2207/20081* (2013.01); *G06T 2207/30144* (2013.01)

(58) Field of Classification Search
CPC ... B41J 2029/3935; B41J 2/195; G06T 7/001; G06T 7/70; G06T 7/90; G06T 2207/10008; G06T 2207/10024; G06T 2207/20081; G06T 2207/30144; G06T 2207/30164; G06N 3/08; G06N 347/14; G06N 347/19
See application file for complete search history.

(56) References Cited

U.S. PATENT DOCUMENTS

| | | | |
|---|---|---|---|
| 2013/0187970 A1 | 7/2013 | Inoue | |
| 2017/0190194 A1 | 7/2017 | Zollner et al. | |
| 2018/0086049 A1 | 3/2018 | Ueshima | |
| 2019/0304085 A1 | 10/2019 | Dekel-Klein et al. | |
| 2021/0021736 A1 | 1/2021 | Hasegawa et al. | |
| 2022/0080736 A1* | 3/2022 | Suzuki | B41J 2/0451 |

FOREIGN PATENT DOCUMENTS

| | | |
|---|---|---|
| JP | 6576316 | 9/2019 |
| JP | 2020186938 | 11/2020 |
| JP | 2020189425 | 11/2020 |
| JP | 2021019279 | 2/2021 |

OTHER PUBLICATIONS

"Written Opinion of the International Searching Authority (Form PCT/ISA/237) of PCT/JP2022/008165", mailed on Apr. 5, 2022, with English translation thereof, pp. 1-12.
"Search Report of Europe Counterpart Application", issued on Jul. 5, 2024, p. 1-p. 8.
"Notice of Reasons for Refusal of Japan Counterpart Application", issued on Jul. 18, 2025, with English translation thereof, p. 1-p. 27.
"Office Action of Europe Counterpart Application", issued on Jul. 21, 2026, pp. 1-5.

* cited by examiner

DEFECTIVE NOZZLE ESTIMATION DEVICE, DEFECTIVE NOZZLE ESTIMATION METHOD, DEFECTIVE NOZZLE ESTIMATION PROGRAM, PRINTING DEVICE, AND METHOD FOR MANUFACTURING PRINTED MATTER

CROSS-REFERENCE TO RELATED APPLICATIONS

The present application is a Continuation of PCT International Application No. PCT/JP2022/008165 filed on Feb. 28, 2022 claiming priority under 35 U.S.C § 119(a) to Japanese Patent Application No. 2021-033396 filed on Mar. 3, 2021. Each of the above applications is hereby expressly incorporated by reference, in its entirety, into the present application.

BACKGROUND OF THE INVENTION

1. Field of the Invention

The present invention relates to a defective nozzle estimation device, a defective nozzle estimation method, a defective nozzle estimation program, a printing device, and a method for manufacturing a printed matter, and particularly relates to a technique of estimating a defective nozzle from a plurality of nozzles of each of a plurality of ink jet heads.

2. Description of the Related Art

In an ink jet printing device, a process of outputting a specific pattern and imaging a printed matter of the output pattern with an imaging device to confirm a state of the printed matter is widely used. In particular, since a state of a nozzle of an ink jet head changes before and after printing and cleaning due to an influence of an ink adhesion matter and the like, it is necessary to output a detection pattern to periodically check the state of the nozzle.

For example, JP6576316B discloses an image inspection device that detects a defective nozzle in an ink jet head from data of a read image of a pattern for detecting a defective nozzle recorded using a single-pass type ink jet printing device and stores a history of a result of the detection, detects an image defect in a printed image from data of a read image of a printed image recorded using the ink jet printing device, and specifies the defective nozzle that caused the image defect by collating information about the image defect with history information of the defective nozzle.

SUMMARY OF THE INVENTION

However, in the image inspection device disclosed in JP6576316B, as the number of ink types increases and the number of ink jet heads increases, there is a problem in that the time required to specify the defective nozzle increases due to a limitation of the number of charts to be interrupted in a defect generation portion.

The present invention has been made in view of such circumstances, and an object of the present invention is to provide a defective nozzle estimation device, a defective nozzle estimation method, a defective nozzle estimation program, a printing device, and a method for manufacturing a printed matter, with which a defective nozzle is estimated in a short time.

According to one aspect for achieving the above object, there is provided a defective nozzle estimation device that estimates a defective nozzle of a plurality of ink jet heads of a printing device that prints a printed matter on a print medium by jetting inks from nozzles of the ink jet heads on the basis of print source data, the plurality of ink jet heads jetting inks of different colors from the nozzles, the defective nozzle estimation device comprising: at least one processor; and at least one memory that stores a command to be executed by the at least one processor, in which the at least one processor acquires a position of an image defect of the printed matter caused by the defective nozzle in imaging data based on a captured image in which the printed matter is imaged by a scanner, acquires a first pixel value at the position of the image defect of the imaging data, acquires a second pixel value at a position corresponding to the position of the image defect of reference data, which is the print source data or reference imaging data based on a reference captured image in which a reference printed matter is imaged by the scanner, and estimates at least one defective nozzle candidate, which is a cause of the image defect of the printed matter, using a learning model from the first pixel value and the second pixel value. According to this aspect, the defective nozzle can be estimated in a short time. The defective nozzle is a nozzle that cannot jet the ink normally, and is a nozzle that causes the image defect. In addition, as the reference printed matter, for example, among the printed matters printed based on the print source data, a non-defective printed matter having no image defect can be used.

It is preferable that the learning model outputs a color of an ink of the defective nozzle in a case in which an amount of variation between the first pixel value and the second pixel value, and the second pixel value are given as inputs. Accordingly, it is possible to accurately estimate the color of the ink of the defective nozzle.

It is preferable that the at least one processor acquires the first pixel value of imaging data with a plurality of color components based on a captured image with a plurality of color components in which the printed matter is imaged by a scanner having the plurality of color components, calculates an amount of variation between the first pixel value and the second pixel value for each color component, and estimates a color of an ink of the defective nozzle using information on the color component with a largest amount of variation. Accordingly, it is possible to accurately estimate the color of the ink of the defective nozzle.

It is preferable that the plurality of ink jet heads include five or more ink jet heads that jet a black ink, a cyan ink, a magenta ink, a yellow ink, and a special color ink, respectively. According to this aspect, the color of the defective nozzle can be estimated from the ink jet heads that jet inks of five or more colors.

It is preferable that the at least one processor acquires first corrected imaging data based on a first corrected captured image in which a first corrected printed matter, which is printed by being subjected to a first correction process of, in a case in which a plurality of the estimated defective nozzle candidates are present, suppressing an image defect caused by a first defective nozzle candidate that is at least one of the plurality of defective nozzle candidates, is imaged by the scanner, and determines whether or not the first defective nozzle candidate is a defective nozzle based on the first corrected imaging data. Accordingly, it is possible to determine whether or not the first defective nozzle candidate is a defective nozzle.

It is preferable that the at least one processor acquires second corrected imaging data based on a second corrected captured image in which a second corrected printed matter, which is printed by being subjected to a second correction process of, in a case in which it is determined that the first defective nozzle candidate is not a defective nozzle, suppressing an image defect caused by a second defective nozzle candidate that is at least one of the plurality of defective nozzle candidates and is different from the first defective nozzle candidate, is imaged by the scanner, and determines whether or not the second defective nozzle candidate is a defective nozzle based on the second corrected imaging data. Accordingly, it is possible to determine whether or not the second defective nozzle candidate is a defective nozzle in a case where the first defective nozzle candidate is not a defective nozzle.

It is preferable that in a case in which a plurality of the estimated defective nozzle candidates are present, the at least one processor performs a correction process of suppressing an image defect caused by a defective nozzle candidate selected from the plurality of defective nozzle candidates a plurality of times such that each of the plurality of defective nozzle candidates is selected at least once, acquires a plurality of pieces of corrected imaging data based on a plurality of corrected captured images in which a plurality of corrected printed matters printed using a plurality of pieces of corrected print data obtained by the plurality of times of correction process are imaged by the scanner, and determines whether or not each of the plurality of defective nozzle candidates is a defective nozzle based on the plurality of pieces of corrected imaging data. Accordingly, it is possible to determine whether or not each of the plurality of defective nozzle candidates is a defective nozzle.

It is preferable that in each of the plurality of ink jet heads, a plurality of nozzles are disposed in a nozzle direction, the printing device is a single-pass type printing device which includes a scanner in which a plurality of reading pixels are disposed in the nozzle direction, and a relative movement mechanism for moving the plurality of ink jet heads and the scanner, and the print medium relative to each other in a relative movement direction intersecting the nozzle direction, and which prints the printed matter on the print medium relatively moved in the relative movement direction by jetting inks from the nozzles of the ink jet heads onto the print medium on the basis of the print source data and reads the printed matter with the reading pixels of the scanner, and the at least one processor acquires nozzle mapping information indicating a correspondence relationship between positions of a plurality of nozzles of at least a first ink jet head among the plurality of ink jet heads and pixel positions of the imaging data in the nozzle direction, acquires nozzle mapping correction information for correcting a positional relationship between at least two of the print medium, the first ink jet head, and the scanner in the nozzle direction, corrects the nozzle mapping information using the nozzle mapping correction information, and estimates at least one defective nozzle candidate, which is the cause of the image defect of the printed matter, using the corrected nozzle mapping information. Accordingly, the defective nozzle can be accurately estimated.

According to one aspect for achieving the above object, there is provided a printing device comprising: the defective nozzle estimation device described above; the plurality of ink jet heads that jet inks of different colors from the nozzles; and a relative movement mechanism for moving the plurality of ink jet heads and the print medium relative to each other, in which the printing device prints the printed matter on the relatively moved print medium by jetting inks from the nozzles of the plurality of ink jet heads onto the print medium on the basis of the print source data. According to this aspect, the defective nozzle can be estimated in a short time while printing the printed matter.

According to one aspect for achieving the above object, there is provided a defective nozzle estimation method of estimating a defective nozzle of a plurality of ink jet heads of a printing device that prints a printed matter on a print medium by jetting inks from nozzles of the ink jet heads on the basis of print source data, the plurality of ink jet heads jetting inks of different colors from the nozzles, the defective nozzle estimation method comprising: an image defect position acquisition step of acquiring a position of an image defect of the printed matter caused by the defective nozzle in imaging data based on a captured image in which the printed matter is imaged by a scanner; a first pixel value acquisition step of acquiring a first pixel value at the position of the image defect of the imaging data; a second pixel value acquisition step of acquiring a second pixel value at a position corresponding to the position of the image defect of reference data, which is the print source data or reference imaging data based on a reference captured image in which a reference printed matter is imaged by the scanner; and a defective nozzle candidate estimation step of estimating at least one defective nozzle candidate, which is a cause of the image defect of the printed matter, from the first pixel value and the second pixel value using a learning model. According to this aspect, the defective nozzle can be estimated in a short time.

According to one aspect for achieving the above object, there is provided a method for manufacturing a printed matter, the method comprising: a printing step of, via a printing device that prints a printed matter on a print medium by jetting inks from nozzles of a plurality of ink jet heads that jet inks of different colors from the nozzles on the basis of print source data, printing the printed matter on the print medium by jetting inks from the nozzles of the plurality of ink jet heads onto the print medium on the basis of the print source data; an imaging data acquisition step of acquiring imaging data based on a captured image in which the printed matter is imaged by a scanner; a reference data acquisition step of acquiring reference data, which is the print source data or reference imaging data based on a reference captured image in which a reference printed matter is imaged by the scanner; an image defect detection step of detecting an image defect of the printed matter on the basis of the imaging data; the defective nozzle estimation method described above; and a correction process step of performing a correction process of suppressing the image defect caused by the at least one defective nozzle candidate with respect to the print source data. According to this aspect, it is possible to estimate the defective nozzle in a short time and perform the correction process while printing the printed matter, so that it is possible to manufacture the printed matter while reducing the amount of waste.

According to one aspect for achieving the above object, there is provided a program causing a computer to execute the defective nozzle estimation method described above. A computer-readable non-transitory storage medium in which the program is recorded may be included in this aspect. According to this aspect, the defective nozzle can be estimated in a short time.

According to the present invention, it is possible to improve the estimation accuracy of the defective nozzle candidate.

DESCRIPTION OF THE PREFERRED EMBODIMENTS

Hereinafter, preferred embodiments of the present invention will be described with reference to the accompanying drawings.

First Embodiment

[Overall Configuration of Ink Jet Printing Device]

Figure 1:
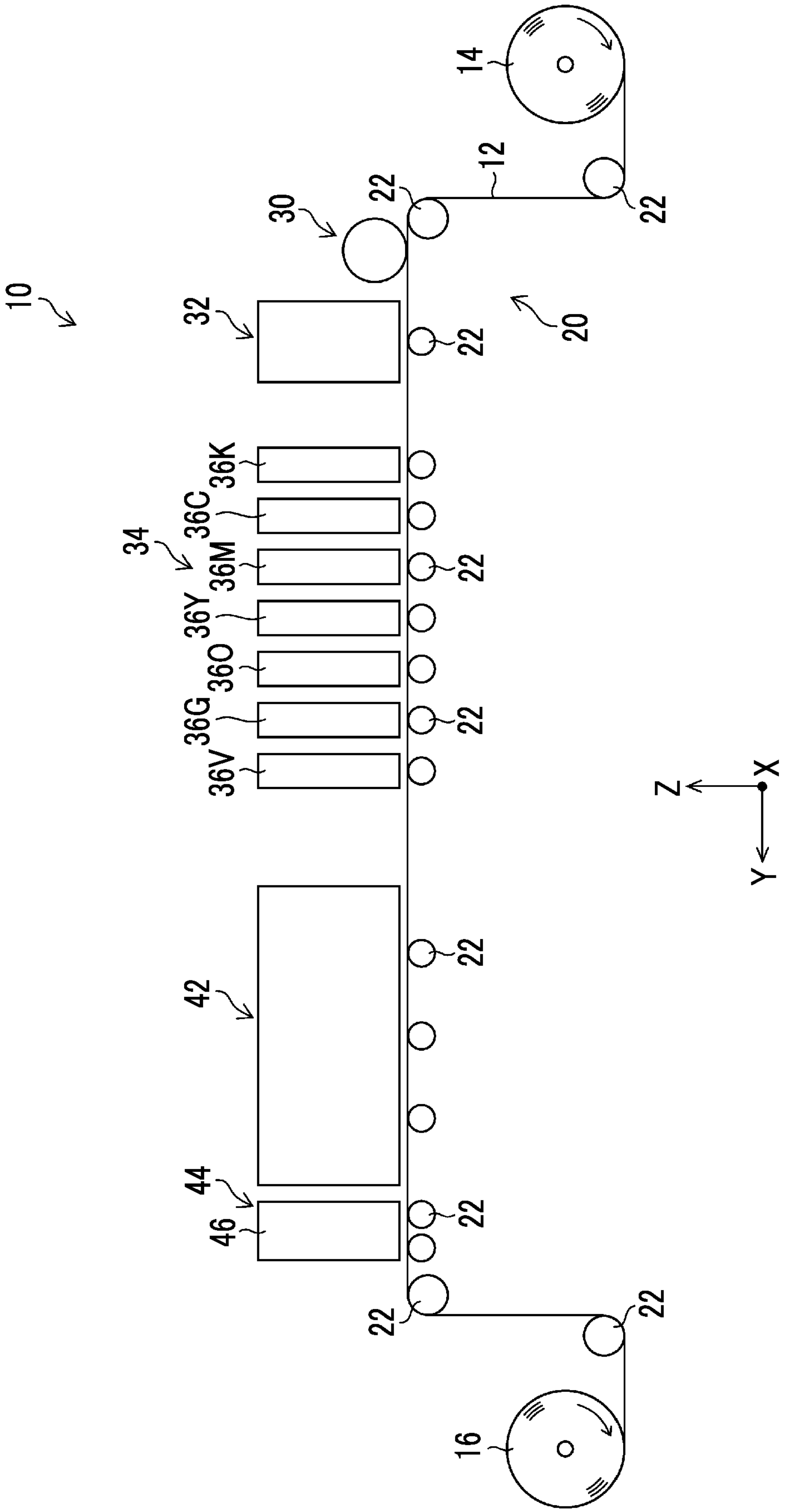
FIG. 1 is an overall configuration diagram of an ink jet printing device.

FIG. 1 is an overall configuration diagram of an ink jet printing device 10. In FIG. 1, an X direction, a Y direction, and a Z direction are directions orthogonal to each other, the X direction and the Y direction are horizontal directions, and the Z direction is a vertical direction. The ink jet printing device 10 is a printing device that prints an image on a long base material 12 (an example of a print medium) by a single-pass method. The base material 12 according to the present embodiment is roll paper.

The base material 12 may be a transparent medium having impermeable properties, which is used for flexible packaging. The term "having impermeable properties" means that even though a pretreatment liquid and an ink, which will be described below, adhere to a surface, they do not permeate an inside. The term "soft packaging" means packaging performed by using a material that is deformed depending on a shape of an article to be packaged. The term "transparent" means that a transmittance of visible light is 30% or more, and is preferably 70% or more.

As shown in FIG. 1, the ink jet printing device 10 comprises a sending roll 14, a winding roll 16, a transport section 20, a treatment liquid application section 30, a treatment liquid drying section 32, an image recording section 34, an ink drying section 42, and an imaging section 44.

[Transport Section]

The sending roll 14 comprises a reel (not shown) which is rotatably supported. The base material 12 before an image is printed is wound around the reel in a roll shape. The winding roll 16 comprises a reel (not shown) which is rotatably supported. One end of the base material 12 is connected to the reel.

The transport section 20 comprises a plurality of guide rollers 22. The plurality of guide rollers 22 are disposed at a position where a transport direction of the base material 12 is turned and at a position facing the transport section 20, the treatment liquid application section 30, the treatment liquid drying section 32, the image recording section 34, the ink drying section 42, and the imaging section 44. In addition, the transport section 20 comprises a sending motor (not shown) that rotationally drives the reel of the sending roll 14, and a winding motor (not shown) that rotationally drives the reel of the winding roll 16.

The transport section 20 rotationally drives the reel of the sending roll 14 by the sending motor, and sends out the base material 12 from the sending roll 14. In addition, the transport section 20 rotationally drives the reel of the winding roll 16 by the winding motor, and winds the printed base material 12 around the winding roll 16.

The transport section 20 guides the base material 12 sent out from the sending roll 14 by the plurality of guide rollers 22, and transports the base material 12 to the treatment liquid application section 30, the treatment liquid drying section 32, the image recording section 34, the ink drying section 42, and the imaging section 44 in this order. In this way, the base material 12 is transported in a roll-to-roll manner along a transport path from the sending roll 14 to the winding roll 16 by being guided by the plurality of guide rollers 22.

The transport section 20 corresponds to a relative movement mechanism for moving the image recording section 34 and the imaging section 44, and the base material 12 relative to each other in a relative movement direction. In the example shown in FIG. 1, the relative movement direction is the Y direction.

In addition, the transport section 20 comprises a rotary encoder (not shown). The rotary encoder outputs, for example, an encoder value corresponding to the rotation of any one of the guide rollers 22.

The plurality of guide rollers 22 are disposed on a downstream side of the sending roll 14 in the transport path of the base material 12. The transport direction of the base material 12 sent out from the sending roll 14 is turned by the plurality of guide rollers 22, and the base material 12 is guided to the treatment liquid application section 30.

[Treatment Liquid Application Section]

The treatment liquid application section 30 applies a pretreatment liquid to a printed surface of the base material 12. The pretreatment liquid contains an aggregating agent which has an action of aggregating components contained in an ink. Examples of the aggregating agent include an acidic compound, a polyvalent metal salt, and a cationic polymer.

The pretreatment liquid according to the present embodiment is an acidic liquid which contains an acid as the aggregating agent.

The treatment liquid application section 30 uniformly applies the pretreatment liquid to the printed surface of the base material 12 by using a coating roller (not shown). An application amount of the pretreatment liquid need only be an amount that makes an ink to be applied by the image recording section 34 aggregate appropriately. The treatment liquid application section 30 may apply the pretreatment liquid by using a head that jets the pretreatment liquid by an ink jet method.

[Treatment Liquid Drying Section]

The treatment liquid drying section 32 is disposed on the downstream side of the treatment liquid application section 30 in the transport path of the base material 12. The treatment liquid drying section 32 dries the pretreatment liquid applied to the printed surface of the base material 12.

The treatment liquid drying section 32 can be configured by using known heating means such as a heater, blowing means using blowing air such as a dryer, or means combining these. As the heating means, there is a method of disposing a heat generating body such as a heater on an opposite side to the printed surface of the base material 12, a method of applying warm air or hot air to the printed surface of the base material 12, or a heating method using an infrared heater, and heating may be performed by combining a plurality of these methods.

In addition, a temperature of the printed surface of the base material 12 changes depending on a type of a material, a thickness, and the like of the base material 12, an environmental temperature, and the like. Therefore, it is preferable that a measurement unit that measures the temperature of the printed surface of the base material 12 and a control mechanism that feeds back the temperature value measured by the measurement unit to the treatment liquid drying section 32 are provided, and that the pretreatment liquid is dried while controlling the temperature. A contact or non-contact thermometer is preferable as the measurement unit that measures the temperature of the printed surface of the base material 12.

In addition, a solvent may be removed by using a solvent removing roller or the like. As another aspect, a method of eliminating an excess solvent from the base material 12 using an air knife is also used.

[Image Recording Section]

The image recording section 34 is disposed on the downstream side of the treatment liquid drying section 32 in the transport path of the base material 12. The image recording section 34 applies an ink to the printed surface of the base material 12 to which the pretreatment liquid is applied by an ink jet method to record an image. An aqueous ink is used as the ink. The aqueous ink refers to an ink obtained by dissolving or dispersing water and a coloring material, such as a dye and a pigment, in a solvent soluble in water. Here, seven color inks of a black ink, a cyan ink, a magenta ink, a yellow ink, an orange ink, a green ink, and a violet ink are applied.

The image recording section 34 comprises ink jet heads 36K, 36C, 36M, 36Y, 36O, 36G, and 36V, which are line heads. The ink jet heads 36K, 36C, 36M, 36Y, 36O, 36G, and 36V are disposed at regular intervals along the transport path of the base material 12. The ink jet heads 36K, 36C, 36M, 36Y, 36O, 36G, and 36V comprise a nozzle surface 38 (see FIG. 2) and are disposed such that the nozzle surface 38 faces the base material 12. A plurality of nozzles 40 (see FIG. 2) for jetting the ink are disposed on the nozzle surface 38 over a length equal to or larger than a width in a direction (X direction in FIG. 1) orthogonal to a base material transport direction.

The ink jet heads 36K, 36C, 36M, 36Y, 36O, 36G, and 36V apply aqueous black ink, cyan ink, magenta ink, yellow ink, orange ink, green ink, and violet ink respectively containing black, cyan, magenta, yellow, orange, green, and violet colorants to the printed surface of the base material 12 from the nozzles 40 to record a color image. The ink applied to the printed surface of the base material 12 is aggregated by the pretreatment liquid applied to the printed surface in advance.

A timing at which each of the ink jet heads 36K, 36C, 36M, 36Y, 36O, 36G, and 36V jets ink droplets is synchronized with the encoder value obtained from the rotary encoder of the transport section 20. As described above, the image recording section 34 generates the printed matter using a so-called single-pass method through single scanning on the base material 12 transported in the Y direction by the transport section 20.

Here, the image recording section 34 is configured to apply seven color inks of ink, that is, four basic color inks of black, cyan, magenta, and yellow, and three special color inks of orange, green, and violet. However, of course, other configurations may be used. For example, in addition to the four basic colors, different special color configurations such as red, green, and violet may be used, or further color inks such as black, cyan, magenta, yellow, orange, green, violet, and white may be used. In addition, a light color ink such as light cyan or light magenta may be used.

[Ink Jet Head]

Figure 2:
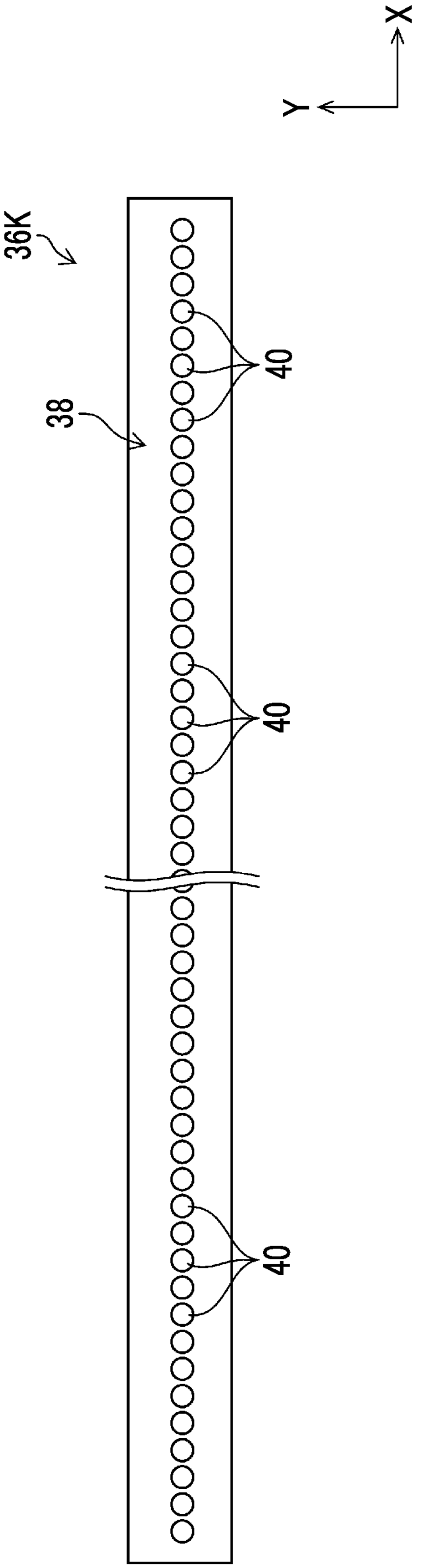
FIG. 2 is a plan view showing a nozzle surface of an ink jet head.

FIG. 2 is a plan view showing the nozzle surface 38 of the ink jet head 36K. As shown in FIG. 2, the plurality of nozzles 40 are disposed on the nozzle surface 38 in a nozzle direction. In the example shown in FIG. 2, the nozzle direction is the X direction. Although FIG. 2 shows an example in which the plurality of nozzles 40 are arranged in a row in the nozzle direction for the sake of simplification of the illustration, the plurality of nozzles 40 may be two-dimensionally disposed on the nozzle surface 38. In the plurality of nozzles 40 that are two-dimensionally disposed, nozzle rows (projection nozzle rows) orthographically projected onto a straight line along a direction orthogonal to the relative movement direction between the ink jet head 36K and the base material 12 substantially form one nozzle row. In the present embodiment, the direction orthogonal to the relative movement direction between the ink jet head 36K and the base material 12 (an example of an intersecting direction) is defined as the nozzle direction, and a density of the nozzles 40 in the nozzle direction is defined as a printing resolution. As an example, the printing resolution of the ink jet head 36K in the nozzle direction is 1200 dpi (dot per inch).

The configurations of the ink jet heads 36C, 36M, 36Y, 36O, 36G, and 36V are the same as the configuration of the ink jet head 36K.

[Ink Drying Section]

Returning to the description of FIG. 1, the ink drying section 42 is disposed on the downstream side of the image recording section 34 in the transport path of the base material 12. The ink drying section 42 dries the ink applied to the printed surface of the base material 12. The ink drying section 42 can have the same configuration as the treatment liquid drying section 32.

[Imaging Section]

The imaging section 44 is disposed on the downstream side of the ink drying section 42 in the transport path of the base material 12. The imaging section 44 comprises a scanner 46.

As the scanner 46, a scanner capable of acquiring read image data represented by image signals of color components of red, green, and blue is used. The scanner 46 comprises a reading surface 48 (see FIG. 3) and is disposed such that the reading surface 48 faces the base material 12. The scanner 46 is a line sensor in which a plurality of light-receiving elements 50G, and 50B (an example of reading pixels, see FIG. 3) are disposed side by side in one direction on the reading surface 48. For example, a charge coupled device (CCD) sensor or a complementary metal oxide semiconductor (CMOS) sensor is used as the line sensor. The scanner 46 optically reads an image printed on the base material 12 using the ink jet heads 36K, 36C, 36M, 36Y, 36O, 36G, and 36V by the plurality of light-receiving elements 50R, and 50B, and generates imaging data of red, green, and blue (RGB) based on the captured image.

Figure 3:
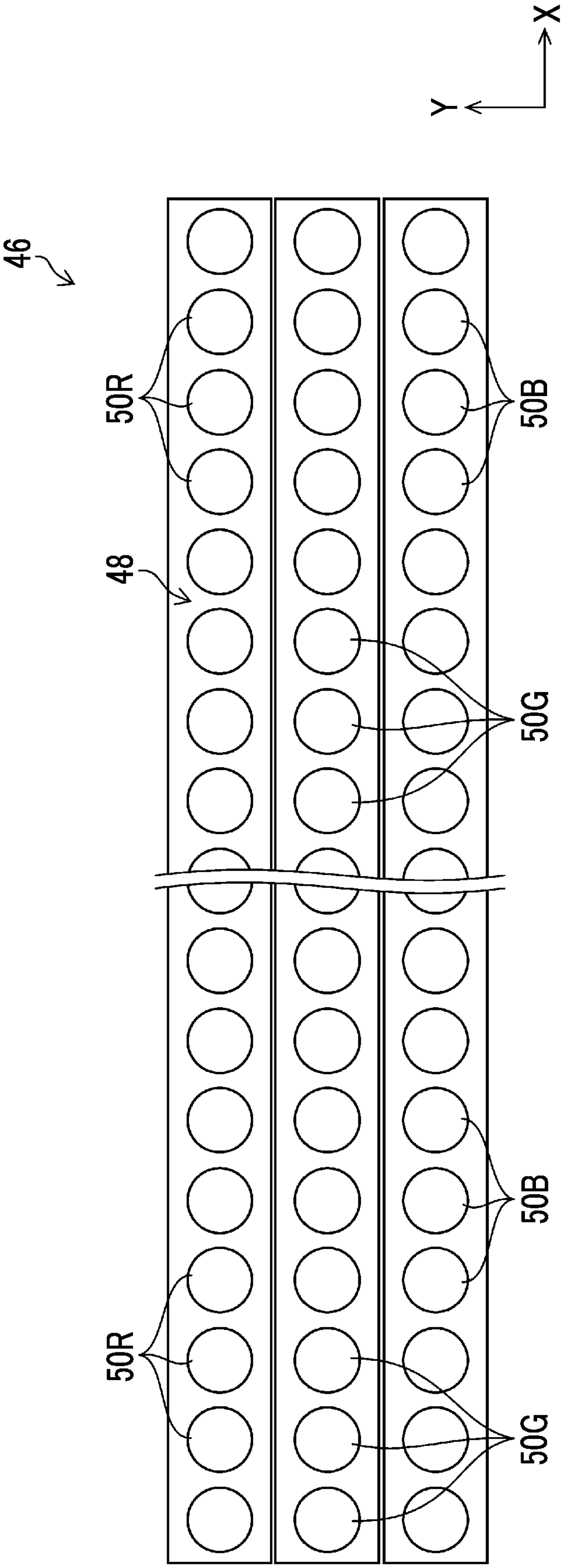
FIG. 3 is a plan view showing a reading surface of a scanner.

FIG. 3 is a plan view showing the reading surface 48 of the scanner 46. As shown in FIG. 3, on the reading surface 48, the plurality of light-receiving elements 50R for reading a red image, the plurality of light-receiving elements 50G for reading a green image, and the plurality of light-receiving elements 50B for reading a blue image are disposed in the nozzle direction (X direction). Here, a reading resolution of the scanner 46 in the nozzle direction is lower than the printing resolution of each of the ink jet heads 36K, 36C, 36M, 36Y, 36O, 36G, and 36V. As an example, the reading resolution of the scanner 46 in the nozzle direction is 300 dpi.

The imaging section 44 may include a light source that irradiates the image printed on the base material 12 with illumination light. In addition, the imaging section 44 may be disposed right behind the image recording section 34 in the transport path of the base material 12 and may be read before the ink is dried.

Returning to the description of FIG. 1 again, the plurality of guide rollers 22 are disposed on the downstream side of the imaging section 44 in the transport path of the base material 12. The transport direction of the base material 12 is turned by the plurality of guide rollers 22, and the base material 12 is guided to the winding roll 16. The winding roll 16 winds the base material 12, which is a printed matter, around a reel.

The ink jet printing device 10 is designed to save a space by turning the transport direction of the base material 12 by the plurality of guide rollers 22 but may transport the base material 12 in a fixed direction from the sending roll 14 to the winding roll 16.

[Control System of Ink Jet Printing Device]

Figure 4:
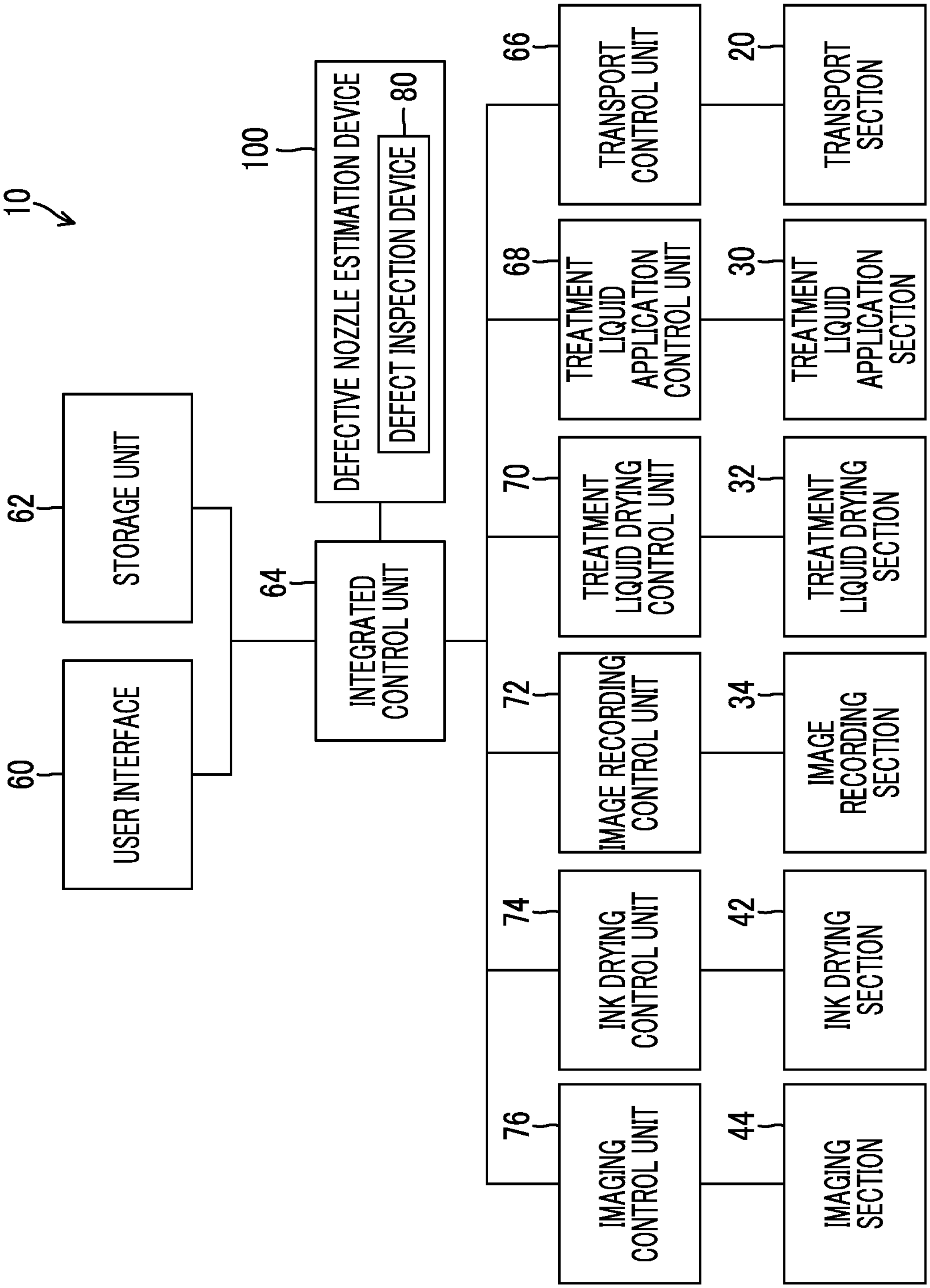
FIG. 4 is a block diagram showing a configuration of a control system of the ink jet printing device.

FIG. 4 is a block diagram showing a configuration of a control system of the ink jet printing device 10. The ink jet printing device 10 comprises a user interface 60, a storage unit 62, an integrated control unit 64, a transport control unit 66, a treatment liquid application control unit 68, a treatment liquid drying control unit 70, an image recording control unit 72, an ink drying control unit 74, an imaging control unit 76, a defect inspection device 80, and a defective nozzle estimation device 100.

The user interface 60 comprises an input unit (not shown) for a user to operate the ink jet printing device 10 and a display unit (not shown) for presenting information to the user. The input unit is, for example, an operation panel that receives an input from the user. The display unit is, for example, a display that displays image data and various types of information. The user can cause the ink jet printing device 10 to print a desired image by using the user interface 60.

The storage unit 62 stores a program for controlling the ink jet printing device 10 and information necessary for executing the program. The storage unit 62 is configured of non-transitory storage medium, such as a hard disk or various semiconductor memories (not shown).

The integrated control unit 64 comprises a processor (not shown), and the processor performs various types of processing in accordance with the program stored in the storage unit 62, and controls the overall operation of the ink jet printing device 10 in an integrated manner. A configuration of the processor of the integrated control unit 64 is the same as that of a processor 102 (see FIG. 5) described below.

The transport control unit 66 controls the motor (not shown) of the transport section 20 to transport the base material 12 in the transport direction by the transport section 20. Accordingly, the base material 12 is transported to the treatment liquid application section 30, the treatment liquid drying section 32, the image recording section 34, the ink drying section 42, and the imaging section 44 in this order. In addition, the transport control unit 66 acquires the encoder value from the rotary encoder (not shown).

The treatment liquid application control unit 68 controls the coating roller or the like of the treatment liquid application section 30 to uniformly apply the pretreatment liquid to the printed surface of the base material 12.

The treatment liquid drying control unit 70 controls the heating means or the like of the treatment liquid drying section 32 to dry the pretreatment liquid applied to the base material 12.

The image recording control unit 72 controls the jetting of ink performed by the ink jet heads 36K, 36C, 36M, 36Y, 36O, 36G, and 36V based on print source data. The image recording control unit 72 jets black, cyan, magenta, yellow, orange, green, and violet ink droplets toward the base material 12 by the inkjet heads 36K, 36C, 36M, 36Y, 36O, 36G, and 36V in synchronization with the encoder value acquired via the transport control unit 66. Accordingly, a color image is printed on the printed surface of the base material 12, and the base material 12 becomes the "printed matter".

In addition, the image recording control unit 72 may have a function of correcting the print source data and suppressing an image defect due to the nozzle 40 (defective nozzle) that cannot jet the ink normally. As an example, there is a function of compensating for the defective nozzle by a correction process of stopping jetting of the ink from a defective nozzle and increasing a volume of ink droplets of the plurality of nozzles 40 adjacent to the defective nozzle.

The ink drying control unit 74 controls the heating means or the like of the ink drying section 42 to dry the ink applied to the base material 12.

The imaging control unit 76 controls the imaging performed by the scanner 46 to cause the imaging section 44 to read the image on the base material 12 (printed matter). The imaging control unit 76 causes the scanner 46 to read the image printed on the base material 12 in synchronization with the encoder value acquired via the transport control unit 66.

[Defective Nozzle Estimation Device]

The defective nozzle estimation device 100 includes a defect inspection device 80. The defect inspection device 80 is a device that detects an image defect of the printed matter. The defective nozzle estimation device 100 is a device that estimates a defective nozzle among the nozzles 40 of the ink jet heads 36K, 36C, 36M, 36Y, 36O, 36G, and 36V by using the image defect of the printed matter detected by the defect inspection device 80. The defective nozzle is a nozzle 40 that cannot jet the ink normally, and is a nozzle 40 that causes the image defect.

Figure 5:
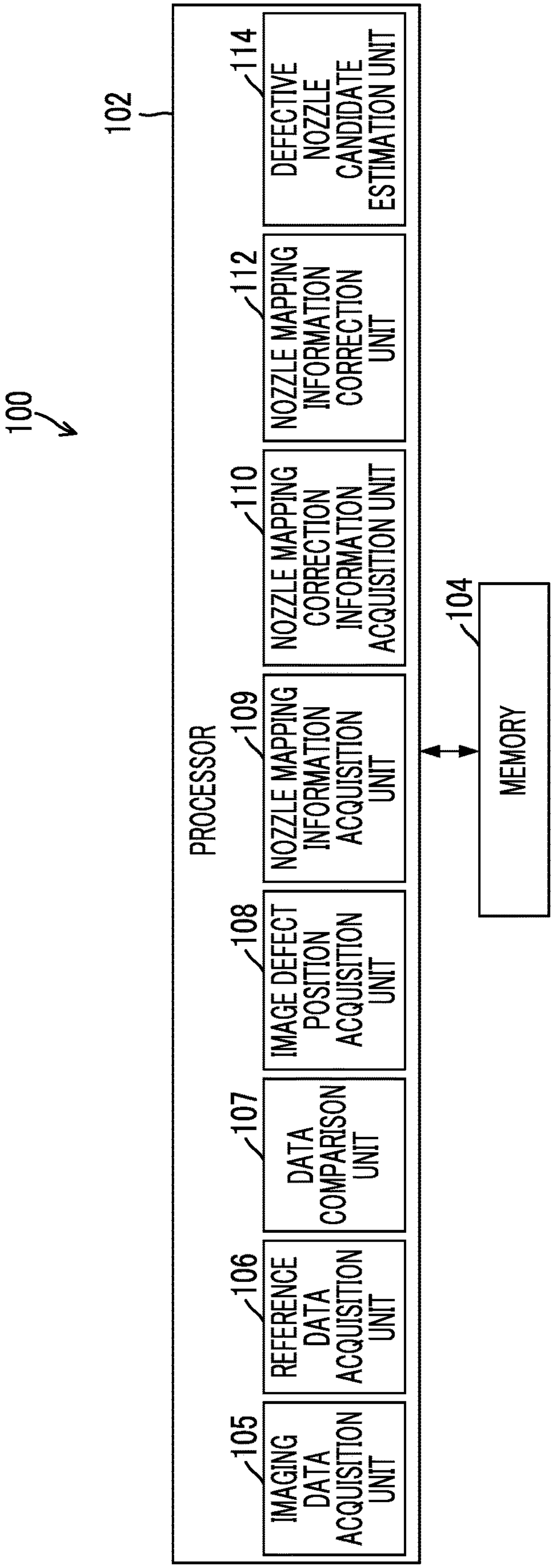
FIG. 5 is a block diagram showing a configuration of a defective nozzle estimation device.

FIG. 5 is a block diagram showing a configuration of the defective nozzle estimation device 100. As shown in FIG. 5, the defective nozzle estimation device 100 comprises a processor 102 and a memory 104.

The memory 104 stores a command to be executed by the processor 102. The processor 102 executes the command stored in the memory 104. The processor 102 operates in accordance with a control program and control data stored in the memory 104, and controls the defective nozzle estimation device 100 in an integrated manner.

A hardware structure of the processor 102 is various processors as described below. The various processors include a central processing unit (CPU) that is a general-purpose processor functioning as various processing units by executing software (program), a graphics processing unit (GPU) that is a processor specialized in image processing, a programmable logic device (PLD) that is a processor of which a circuit configuration is changeable after manufacturing, such as a field programmable gate array (FPGA), a dedicated electric circuit that is a processor having a circuit configuration dedicatedly designed to execute a specific process, such as an application specific integrated circuit (ASIC), or the like.

The processor 102 may be configured of one of these various processors or may be configured of a combination of two or more processors of the same type or different types (for example, a plurality of FPGAs, or a combination of the CPU and the FPGA or a combination of the CPU and the GPU).

More specifically, the hardware structure of these various processors is an electric circuit (circuitry) in which circuit elements such as semiconductor elements are combined.

As shown in FIG. 5, the processor 102 comprises an imaging data acquisition unit 105, a reference data acquisition unit 106, a data comparison unit 107, an image defect position acquisition unit 108, a nozzle mapping information acquisition unit 109, a nozzle mapping correction information acquisition unit 110, a nozzle mapping information correction unit 112, and a defective nozzle candidate estimation unit 114.

The imaging data acquisition unit 105, the reference data acquisition unit 106, and the data comparison unit 107 constitute the defect inspection device 80.

The imaging data acquisition unit 105 acquires imaging data based on a captured image in which the printed matter is imaged by the scanner 46. The imaging data may be the captured image itself, data obtained by subjecting the captured image to image processing, or data obtained by converting a resolution of the captured image.

The reference data acquisition unit 106 acquires the print source data as reference data. The reference data acquisition unit 106 may acquire reference imaging data based on a reference captured image in which a reference printed matter is imaged by the scanner 46, as the reference data. The reference printed matter is, for example, a non-defective printed matter having no image defect among the printed matters printed based on the print source data. The reference imaging data may be the reference captured image itself, data obtained by subjecting the reference captured image to image processing, or data obtained by converting a resolution of the reference captured image. The reference data acquisition unit 106 acquires reference data from, for example, the storage unit 62 or the memory 104.

The data comparison unit 107 detects the image defect of the printed matter by comparing the imaging data acquired by the imaging data acquisition unit 105 with the reference data acquired by the reference data acquisition unit 106. The image defect includes streaks and ink missing. Here, the data comparison unit 107 performs registration between the imaging data and the reference data, and detects the image defect of the printed matter from a difference between the imaging data and the reference data after the registration. It is preferable that the difference between the imaging data and the reference data is calculated after the resolution of the imaging data and the resolution of the reference data are matched. The data comparison unit 107 may perform the registration between the imaging data and the reference data using nozzle mapping information described below.

In addition, the defect inspection device 80 classifies the printed matter into a non-defective printed matter and a defective printed matter according to a degree of the image defect detected by the data comparison unit 107. In the ink jet printing device 10, a stamp process may be performed on a portion of the defective printed matter of the base material 12 by using a stamper (not shown).

The image defect position acquisition unit 108 acquires a position of the image defect of the printed matter caused by the defective nozzle in the imaging data based on the captured image in which the printed matter is imaged by the scanner 46. In a first embodiment, the image defect position acquisition unit 108 acquires the position of the image defect, particularly in the nozzle direction. The data comparison unit 107 detects the image defect by comparing the imaging data with the reference data. Therefore, the image defect position acquisition unit 108 can acquire the position of the image defect in the imaging data from the imaging data and the information on the image defect.

The nozzle mapping information acquisition unit 109 acquires nozzle mapping information. The nozzle mapping information is information indicating a correspondence relationship between positions of the plurality of nozzles 40 of each of the ink jet heads 36K, 36C, 36M, 36Y, 36O, 36G, and 36V and pixel positions of the imaging data in the nozzle direction. That is, the nozzle mapping information is information provided for each of the ink jet heads 36K, 36C, 36M, 36Y, 36O, 36G, and 36V The nozzle mapping information is stored in advance in the memory 104.

The nozzle mapping correction information acquisition unit 110 acquires a plurality of nozzle mapping correction information for correcting the nozzle mapping information for each of the ink jet heads 36K, 36C, 36M, 36Y, 36O, 36G, and 36V. Each nozzle mapping correction information is information for correcting a positional relationship in the nozzle direction between at least two of the base material 12, corresponding one among the ink jet heads 36K, 36C, 36M, 36Y, 36O, 36G, and 36V, and the scanner 46. For example, the nozzle mapping correction information of the ink jet head 36K is information for correcting the positional relationship in the nozzle direction between at least two of the base material 12, the ink jet head 36K (an example of a first ink jet head), and the scanner 46.

The nozzle mapping information correction unit 112 corrects the nozzle mapping information acquired by the nozzle mapping information acquisition unit 109 by using the nozzle mapping correction information acquired by the nozzle mapping correction information acquisition unit 110. For example, the nozzle mapping information correction unit 112 corrects the nozzle mapping information of the ink jet head 36K by using the nozzle mapping correction information of the ink jet head 36K.

The defective nozzle candidate estimation unit 114 estimates at least one defective nozzle candidate which is a cause of the image defect by using the nozzle mapping information corrected by the nozzle mapping information correction unit 112.

In the ink jet printing device 10, although the defective nozzle estimation device 100 includes the defect inspection device 80, the defect inspection device 80 and the defective nozzle estimation device 100 may be provided separately.

[Nozzle Mapping Information]

The nozzle mapping information is information indicating a correspondence relationship between positions of the plurality of nozzles 40 for each of the ink jet heads 36K, 36C, 36M, 36Y, 36O, 36G, and 36V and pixel positions of the imaging data in the nozzle direction. That is, the nozzle mapping information is information indicating to which pixel in the imaging data based on the captured image read by the scanner 46 the dot jetted from which nozzle 40 is imaged.

Here, for the sake of description, the plurality of nozzles 40 of each of the ink jet heads 36K, 36C, 36M, 36Y, 36O, 36G, and 36V are assigned nozzle numbers 1, 2, 3, . . . in order from one toward the other in the nozzle direction.

For example, among the plurality of nozzles 40 of the ink jet head 36K, a nozzle 40 sufficiently spaced apart therefrom in the captured image continuously jets an ink so that black line segment (line) extending in the transport direction is printed on the base material 12. The imaging data obtained by reading this line segment with the scanner 46 is acquired and which light-receiving elements 50R, 50G, and 50B read the printed line segment is detected, whereby a correspondence relationship between each pixel of the imaging data and the nozzle number of the nozzle 40 that jets the ink can be acquired for the ink jet head 36K.

In this processing, the ink is jetted from one nozzle 40 for every, for example, 100 nozzles 40 of the ink jet head 36K, and a plurality of line segments (charts) extending in the transport direction and located at equal intervals in the nozzle direction are printed. The scanner 46 reads the plurality of line segments, whereby it is possible to estimate at which positions of the light-receiving elements 50R, 50G, and 50B of the imaging data the line segment printed by each nozzle 40 of the ink jet head 36K is printed. The same applies to the ink jet heads 36C, 36M, 36Y, 36O, 36G, and 36V.

The nozzle mapping information is held, for example, as a table showing, for all the line segments, to which pixel of the imaging data the line segment printed by each nozzle 40 corresponds. As the nozzle mapping information, the pixel positions of the imaging data with respect to the nozzles 40 provided at regular intervals may be held. The nozzle mapping information held in this way may be converted into a linear form and used.

In addition, as the nozzle mapping information, only information indicating to which pixel positions of the imaging data the line segments of the nozzles 40 provided at both ends in the nozzle direction correspond may be held. In the nozzle mapping information held in this way, the pixel position of the imaging data with respect to each nozzle 40 may be interpolated on the assumption that all the nozzles 40 between both ends are provided at equal intervals.

In the case of the single-pass type ink jet printing device 10, the nozzle 40 that outputs each pixel in the nozzle direction in the reference data is always fixed. Therefore, it is possible to obtain from which nozzle 40 of the plurality of nozzles 40 the reference data is output. Meanwhile, it is possible to obtain to which pixel position of the imaging data the line segment printed by each nozzle 40 corresponds, from the nozzle mapping information. Therefore, it is possible to obtain to which pixel position of the imaging data the pixel of the reference data in the nozzle direction corresponds.

Figure 6:
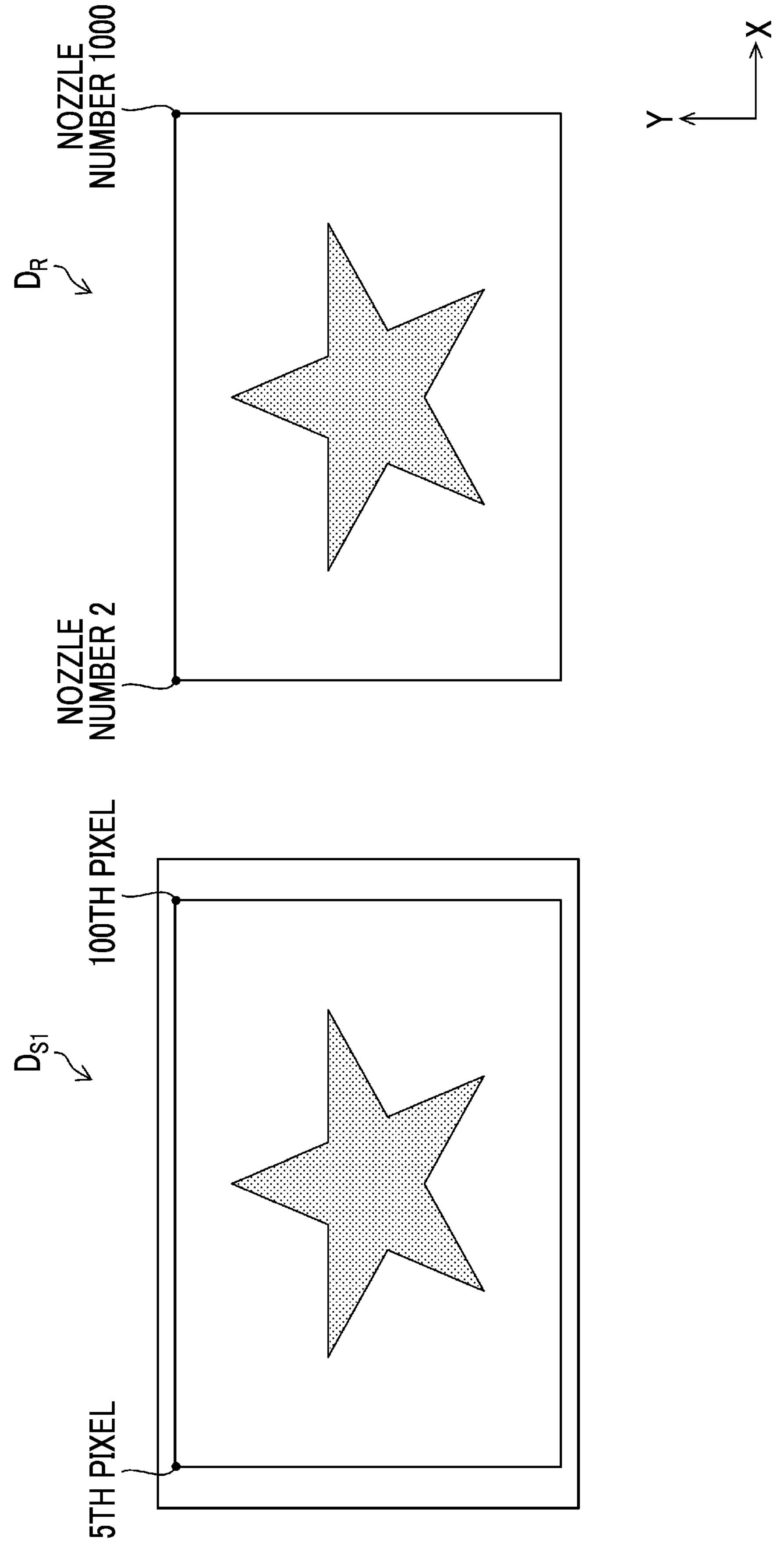
FIG. 6 is a diagram showing an example of a relationship between imaging data and reference data.

FIG. 6 is a diagram showing an example of a relationship between imaging data $D_{S1}$ and reference data $D_R$. As shown in FIG. 6, in this example, for the reference data $D_R$, the left end in the nozzle direction is printed by the nozzle 40 of the nozzle number 2, and the right end in the nozzle direction is printed by the nozzle 40 of the nozzle number 1000.

Here, it is known that the 5th pixel of the imaging data $D_{S1}$ corresponds to a region printed by the nozzles 40 of the nozzle numbers 2 and 3, and the 100th pixel of the imaging data $D_{S1}$ corresponds to a region printed by the nozzles 40 of the nozzle numbers 999 and 1000, based on the nozzle mapping information. The pixel and the nozzle number need only be made to correspond to each other through the interpolation, for the region between these.

In this way, the nozzle mapping information is used, so that it is possible to perform registration between the imaging data $D_{S1}$ and the reference data $D_R$ in the nozzle direction. The nozzle mapping information is created for each of the ink jet heads 36K, 36C, 36M, 36Y, 36O, 36G, and 36V, or for each ink color, whereby it is possible to calculate which position in the nozzle direction of the nozzle 40 (nozzle position) of each of the ink jet heads 36K, 36C, 36M, 36Y, 36O, 36G, and 36V the image defect corresponds to.

[Nozzle Mapping Correction Information]

The nozzle mapping correction information is information for correcting the nozzle mapping information, and specifically information for correcting a positional relationship in the nozzle direction between at least two of the base material 12, any of the ink jet heads 36K, 36C, 36M, 36Y, 36O, 36G, and 36V, and the scanner 46.

The nozzle mapping correction information is, for example, information on an edge position of the base material 12 in the nozzle direction in the imaging data. This nozzle mapping correction information is information for correcting the positional relationship in the nozzle direction between the base material 12 and the scanner 46, and is information for correcting the influence of the meandering of the base material 12.

The nozzle mapping correction information acquisition unit 110 detects an edge of the base material 12 from the imaging data, calculates a difference between an edge position in a case in which the nozzle mapping information is acquired and an edge position during printing (in a case of estimating a defective nozzle), and generates the nozzle mapping correction information for correcting the influence of the meandering of the base material 12. The nozzle mapping information correction unit 112 corrects the nozzle mapping information using the nozzle mapping correction information, so that it is possible to estimate the nozzle positions of the ink jet heads 36K, 36C, 36M, 36Y, 36O, 36G, and 36V regardless of the influence of the meandering of the base material 12.

Figure 7:
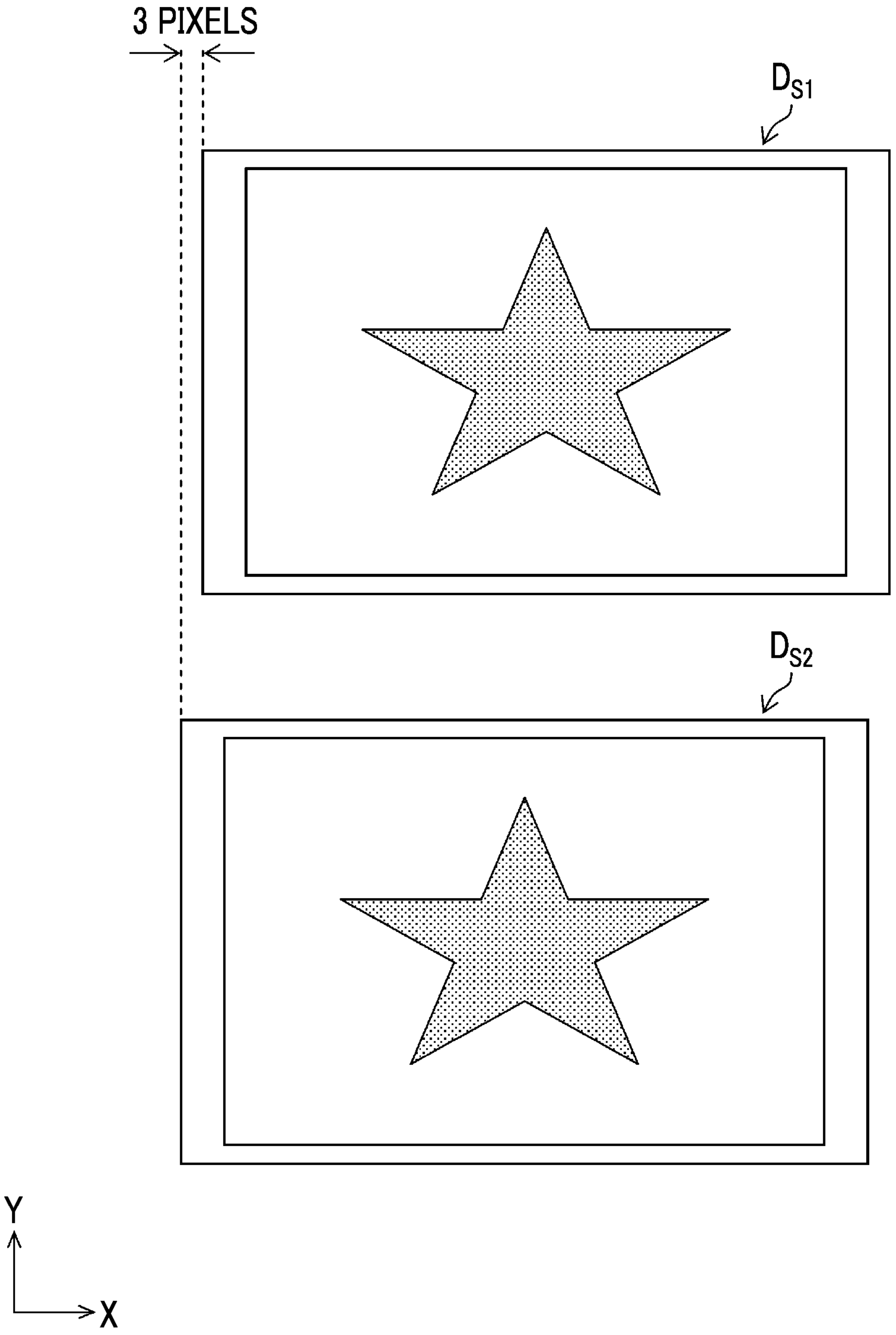
FIG. 7 is a diagram showing an example of a relationship between imaging data in a case in which nozzle mapping information is acquired and imaging data in a case in which defective nozzle estimation is performed.

FIG. 7 is a diagram showing an example of a relationship between imaging data $D_{S1}$ in a case in which the nozzle mapping information is acquired and imaging data $D_{S2}$ in a case in which the defective nozzle is estimated. As shown in FIG. 7, in this example, the edge position of the base material 12 of the imaging data $D_{S2}$ is shifted by 3 pixels in the −X direction from the edge position of the base material 12 of the imaging data $D_{S1}$. Therefore, the nozzle mapping correction information is information for correcting the nozzle mapping information by −3 pixels.

The nozzle mapping information correction unit 112 corrects the nozzle mapping information using the nozzle mapping correction information.

Figure 8:
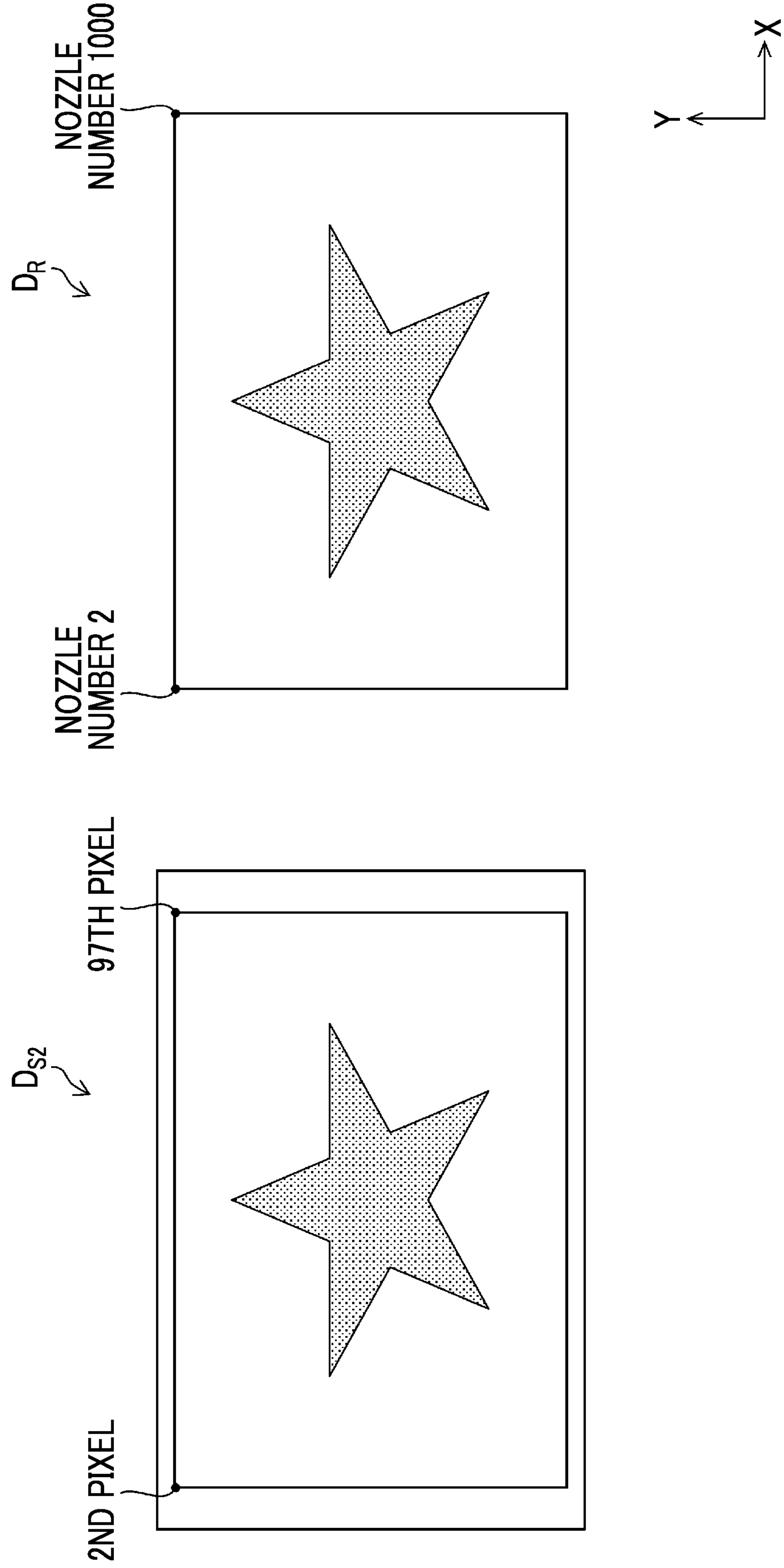
FIG. 8 is a diagram showing an example of a relationship between imaging data based on corrected nozzle mapping information and the reference data.

FIG. 8 is a diagram showing an example of a relationship between the imaging data $D_{S2}$ based on the corrected nozzle mapping information and the reference data $D_R$. As shown in FIG. 8, it can be seen that the 2nd pixel of the imaging data $D_{S2}$ corresponds to a region printed by the nozzles 40 of the nozzle numbers 2 and 3, and the 97th pixel of the imaging data $D_{S2}$ corresponds to a region printed by the nozzles 40 of the nozzle numbers 999 and 1000, on the basis of the corrected nozzle mapping information.

Of course, information other than the edge position of the base material 12 may be used as the nozzle mapping correction information for correcting the influence of the meandering of the base material 12. For example, in a case of a transparent base material whose edge position is difficult to be acquired, an ink may be jetted from one nozzle 40 (one example of a specific nozzle) at left and right end parts of each of the ink jet heads 36K, 36C, 36M, 36Y, 36O, 36G, and 36V to form a line segment extending in the transport direction to the base material 12, and information on a position of the formed line segment in the nozzle direction (one example of a position in the nozzle direction on the print medium) may be used. The nozzle mapping correction information can be generated by calculating a difference between the position of the line segment in the nozzle direction in a case in which the nozzle mapping information is acquired and the position of the line segment in the nozzle direction in a case in which the defective nozzle is estimated. The nozzle mapping correction information in this case is also information for correcting the positional relationship in the nozzle direction between the base material 12 and the scanner 46. By using this nozzle mapping correction information, it is possible to correct the influence of the meandering of the base material 12 as in the case of the base material edge.

In addition, the meandering correction may be performed based on meandering information. For example, there are a case in which the ink jet heads 36K, 36C, 36M, 36Y, 36O, 36G, and 36V are moved by a meandering amount, and a case in which the print source data is shifted for printing. In a case of performing the meandering correction, a mark such as a register mark is output to an end part outside an image region of the printed matter, measurement for the meandering correction is performed, and a movement amount of each of the ink jet heads 36K, 36C, 36M, 36Y, 36O, 36G, and 36V, and a shift amount of the print source data are measured and corrected. In this case, the correction amount can be used as the nozzle mapping correction information. The nozzle mapping correction information in this case is information for correcting the positional relationship in the nozzle direction between the base material 12 and each of the ink jet heads 36K, 36C, 36M, 36Y, 36O, 36G, and 36V, and is Information for correcting the positional relationship in the nozzle direction between each of the ink jet heads 36K, 36C, 36M, 36Y, 36O, 36G, and 36V and the scanner 46.

The nozzle mapping correction information may be information for correcting the nozzle mapping information according to the thickness of the base material 12. Since a distance between the scanner 46 and the guide roller 22 is constant, a distance between the scanner 46 and the printed surface of the base material 12 varies depending on the thickness of the base material 12. Therefore, in a case in which the scanner 46 reads the printed matter printed on the base material 12, a slight deviation occurs from a focal length of the scanner 46 due to the difference in the thickness of the base material 12, and scaling occurs in the imaging data. Since a shift occurs in the nozzle mapping information because of the scaling of the imaging data, the nozzle mapping information correction unit 112 corrects the nozzle mapping information according to the thickness of the base material 12, thereby enabling registration with a higher accuracy. The nozzle mapping correction information in this case is information for correcting the positional relationship in the nozzle direction between the base material 12 and the scanner 46.

The nozzle mapping information acquisition unit 109 may acquire a plurality of nozzle mapping information according to the thickness of the base material 12. The plurality of nozzle mapping correction information according to the thickness of the base material 12 are information for correcting the positional relationship in the nozzle direction between the base material 12 and the scanner 46.

As a specific example, in order to obtain the correspondence relationship between the position of each nozzle 40 during printing and the pixel position of the imaging data in the nozzle direction, a chart in which only a specific nozzle 40 jets an ink or a chart in which only a specific nozzle 40 does not jet an ink is printed on the base material 12, and at which position in the imaging data dots of the ink jetted from the specific nozzle 40 in a case in which the printed chart is read by the scanner 46 appear is calculated, thereby calculating the nozzle mapping information indicating the correspondence relationship between the position of the nozzle 40 and the pixel position of the imaging data in the nozzle direction. This calculation is performed for each thickness of the base material 12, a plurality of nozzle mapping information is held, and the nozzle mapping information is switched according to the thickness of the base material 12 in a case of performing an inspection. By this switching, it is possible to cope with a slight deviation in the correspondence relationship due to the thickness of the base material 12.

The process of acquiring the plurality of nozzle mapping information according to the thickness of the base material 12 by the nozzle mapping information acquisition unit 109 is a process included in the concept of correcting the nozzle mapping information according to the thickness of the base material 12.

[Defective Nozzle Estimation Method]

Figure 9:
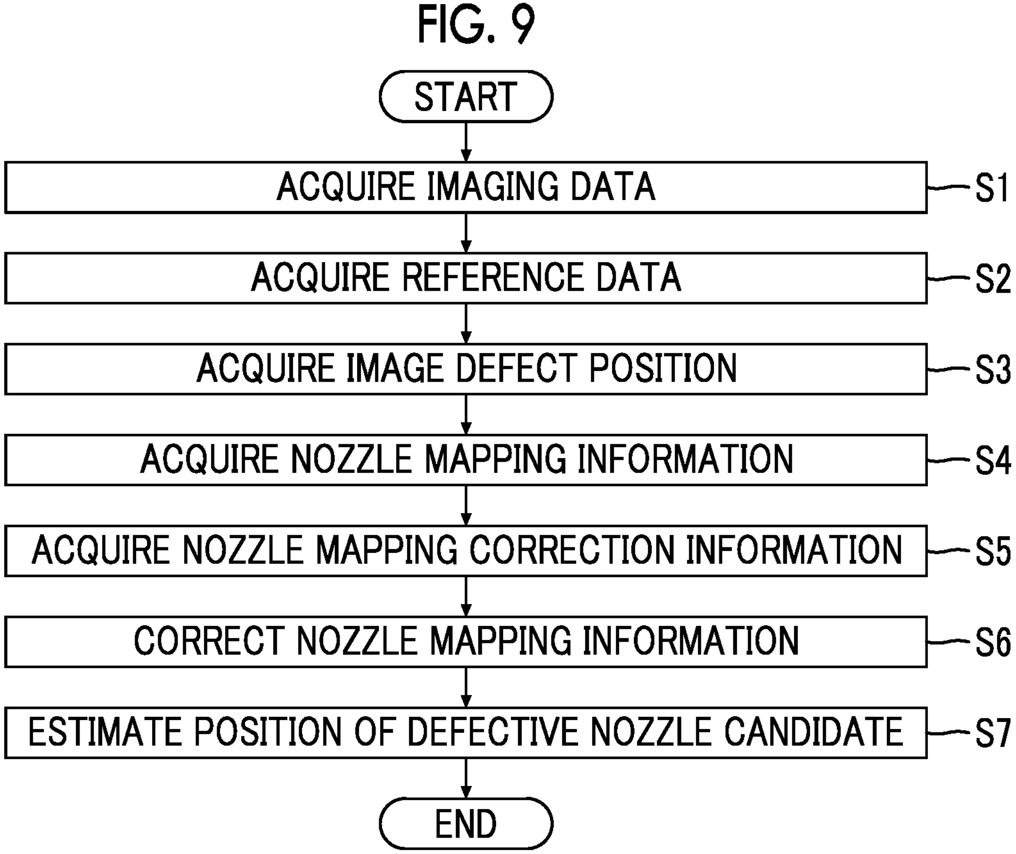
FIG. 9 is a flowchart showing processing of a defective nozzle estimation method by a defective nozzle estimation device 100.

FIG. 9 is a flowchart showing processing of a defective nozzle estimation method by the defective nozzle estimation device 100. The defective nozzle estimation method is stored in the memory 104 as a defective nozzle estimation program to be executed by a computer, and is realized by the processor 102 executing the defective nozzle estimation program.

In step S1 (an example of an imaging data acquisition step), the imaging data acquisition unit 105 of the processor 102 acquires the imaging data based on the captured image in which the printed matter is imaged by the scanner 46 via the integrated control unit 64.

In step S2 (an example of a reference data acquisition step), the reference data acquisition unit 106 acquires the print source data or the reference imaging data as the reference data.

In step S3 (an example of an image defect position acquisition step), the data comparison unit 107 of the processor 102 detects the image defect of the printed matter by comparing the imaging data acquired in step S1 with the reference data acquired in step S2. Further, the image defect position acquisition unit 108 of the processor 102 acquires the position in the nozzle direction of the image defect of the printed matter in the imaging data.

In step S4 (an example of a nozzle mapping information acquisition step), the nozzle mapping information acquisition unit 109 acquires the nozzle mapping information from the memory 104.

In step S5 (an example of a nozzle mapping correction information acquisition step), the nozzle mapping correction information acquisition unit 110 acquires the nozzle mapping correction information. Here, the nozzle mapping correction information is information on the edge position of the base material 12 in the nozzle direction in the imaging data. The nozzle mapping correction information acquisition unit 110 acquires the imaging data via the integrated control unit 64, and detects the edge position of the base material 12 from the imaging data. In addition, the nozzle mapping correction information acquisition unit 110 acquires the information on the edge position in a case in which the nozzle mapping information is acquired. The information on the edge position in a case in which the nozzle mapping information is acquired is stored in, for example, the memory 104. Further, the nozzle mapping correction information acquisition unit 110 calculates the difference between the edge position of the base material 12 acquired from the imaging data and the edge position in a case in which the nozzle mapping information is acquired to generate the nozzle mapping correction information.

In step S6 (an example of a nozzle mapping information correction step), the nozzle mapping information correction unit 112 corrects the nozzle mapping information acquired in step S4 by using the nozzle mapping correction information acquired in step S5.

In step S7 (an example of a defective nozzle candidate estimation step), the defective nozzle candidate estimation unit 114 calculates the position in the nozzle direction of the image defect acquired in step S3 using the nozzle mapping information corrected in step S6, and estimates at least one position of a defective nozzle candidate, which is a cause of the image defect, from the nozzles 40 of each of the ink jet heads 36K, 36C, 36M, 36Y, 36O, 36G, and 36V.

In transporting the base material 12 which is roll paper, in a case in which the base material 12 is deformed because of application and drying of the ink, or in a case in which a distance between the image recording section 34 and the imaging section 44 is distant, or in a case in which meandering of the base material 12 occurs because of local deterioration of a transport accuracy of the transport section 20, a shift may occur in the nozzle mapping information because of the influence of the meandering. In a case in which the shift occurs, an accuracy of estimating the position of the defective nozzle is affected, and there is a possibility that the defective nozzle position of the correct answer is not included in the estimation candidates of the defective nozzle position.

Thus, the ink jet printing device 10 detects an edge of the base material 12, calculates a difference between an edge position of the base material 12 in a case of acquiring the nozzle mapping information, and an edge position of the base material 12 during printing, generates the nozzle mapping correction information for correcting the meandering influence, and performs the correction. Accordingly, it is possible to estimate the nozzle position regardless of the influence of the meandering of the base material 12. The nozzle mapping information and the nozzle mapping correction information are created for each of the ink jet heads 36C, 36M, 36Y, 36O, 36G, and 36V, or for each ink color, whereby it is possible to calculate which nozzle position of the ink jet heads 36C, 36M, 36Y, 36O, 36G, and 36V the image defect corresponds to. Accordingly, the nozzle estimation accuracy is improved, and the amount of waste can be reduced.

Second Embodiment

The ink jet printing device according to a second embodiment will be described. A common reference numeral is assigned to a portion common to the ink jet printing device 10 according to the first embodiment, and detailed description thereof will be omitted.

[Defective Nozzle Estimation Device]

The ink jet printing device 10 according to the second embodiment comprises a defective nozzle estimation device 120. The defective nozzle estimation device 120 is a device that estimates a color (ink jet heads 36K, 36C, 36M, 36Y, 36O, 36G, and 36V having a defective nozzle) of an ink jetted from a defective nozzle among the nozzles 40 of the ink jet heads 36K, 36C, 36M, 36Y, 36O, 36G, and 36V by using the image defect of the printed matter detected by the defect inspection device 80.

Figure 10:
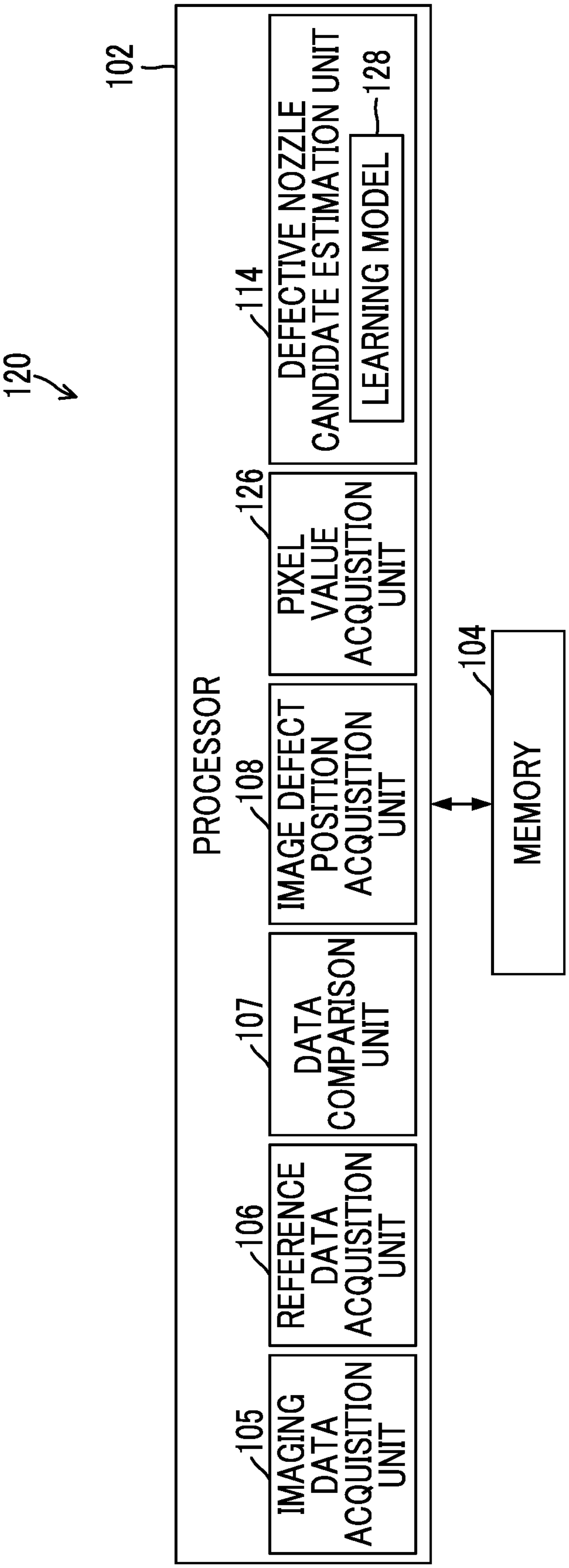
FIG. 10 is a block diagram showing a configuration of a defective nozzle estimation device.

FIG. 10 is a block diagram showing a configuration of the defective nozzle estimation device 120. As shown in FIG. 10, the processor 102 of the defective nozzle estimation device 120 comprises the imaging data acquisition unit 105, the reference data acquisition unit 106, the data comparison unit 107, and the image defect position acquisition unit 108, as with the defective nozzle estimation device 100. Further, the processor 102 of the defective nozzle estimation device 120 comprises a pixel value acquisition unit 126 and the defective nozzle candidate estimation unit 114.

The pixel value acquisition unit 126 acquires the amount of variation in a pixel value of the imaging data at the position of the image defect. The amount of variation is represented by a difference between a first pixel value of the imaging data at the position of the image defect and a second pixel value of the reference data of the position corresponding to the position of the image defect. Here, the position corresponding to the position of the image defect in the reference data refers to the same position as the position of the image defect in the imaging data in the reference data registered with the imaging data.

Here, the pixel value acquisition unit 126 acquires the first pixel value and the second pixel value, and calculates the difference therebetween. The pixel value acquisition unit 126 may acquire the first pixel value and the second pixel value by performing the registration between the imaging data and the reference data. For the registration between the imaging data and the reference data, the nozzle mapping information of the first embodiment may be used.

Further, the defective nozzle candidate estimation unit 114 comprises a learning model 128. The learning model 128 is a trained model that outputs the color of the ink of the defective nozzle in a case in which the amount of variation in the pixel value of the imaging data at least at the position of the image defect is given as an input. The learning model 128 is configured of, for example, a neural network. Here, the learning model 128 is a trained model that outputs the color of the ink of the defective nozzle in response to an input of the amount of variation in the pixel value of the imaging data at the position of the image defect and the pixel value of the reference data of the position corresponding to the position of the image defect.

The pixel value of the reference data input to the learning model 128 is a value having the same resolution as the resolution of the imaging data. Therefore, in a case in which the printing resolution of the reference data is higher than the reading resolution of the imaging data, the pixel value of the reference data is an average value of the pixel values in the nozzle direction of the region including the image defect. For example, in a case in which the reference data is the print source data, the printing resolution is 1200 dpi, and the reading resolution is 300 dpi, the pixel value of the reference data is an average value of the regions for four adjacent nozzles including the image defect.

The learning model 128 is generated by being trained using learning data with a set of the amount of variation in the pixel value of the imaging data at the position of the image defect generated by the known defective nozzle 40, the pixel value of the reference data at the position of the image defect, and the color of the ink of the defective nozzle 40. In addition, the learning model 128 may be generated by being trained using learning data with a set of the amount of variation in the pixel value of the imaging data at the position of the pseudo-image defect created by the nozzle 40 that does not jet an ink, the pixel value of the reference data at the position of the pseudo-image defect, and the color of the ink of the nozzle 40 that does not jet an ink. The learning data may be acquired from the amount of variation in a pixel value of imaging data of a screen tint image in which the presence or absence of application of an ink of a specific color is switched, instead of the pseudo-image defect.

The amount of variation can be acquired as the difference between the first pixel value and the second pixel value. In addition, the pixel value of the reference data of the position corresponding to the position of the image defect is the second pixel value. Therefore, the learning model 128 may be a trained model that outputs the color of the ink of the defective nozzle in response to an input of the first pixel value and the second pixel value. The learning model 128 in this case is generated by being trained using, for example, learning data with a set of the pixel value of the imaging data at the position of the image defect generated by the known defective nozzle 40, the pixel value of the reference data, and the color of the ink of the defective nozzle 40.

The defective nozzle candidate estimation unit 114 inputs the amount of variation in the pixel value of the imaging data at the position of the image defect to the learning model 128, and causes the learning model 128 to estimate at least one defective nozzle candidate which is a cause of the image defect of the printed matter.

[Defective Nozzle Estimation Method]

Figure 11:
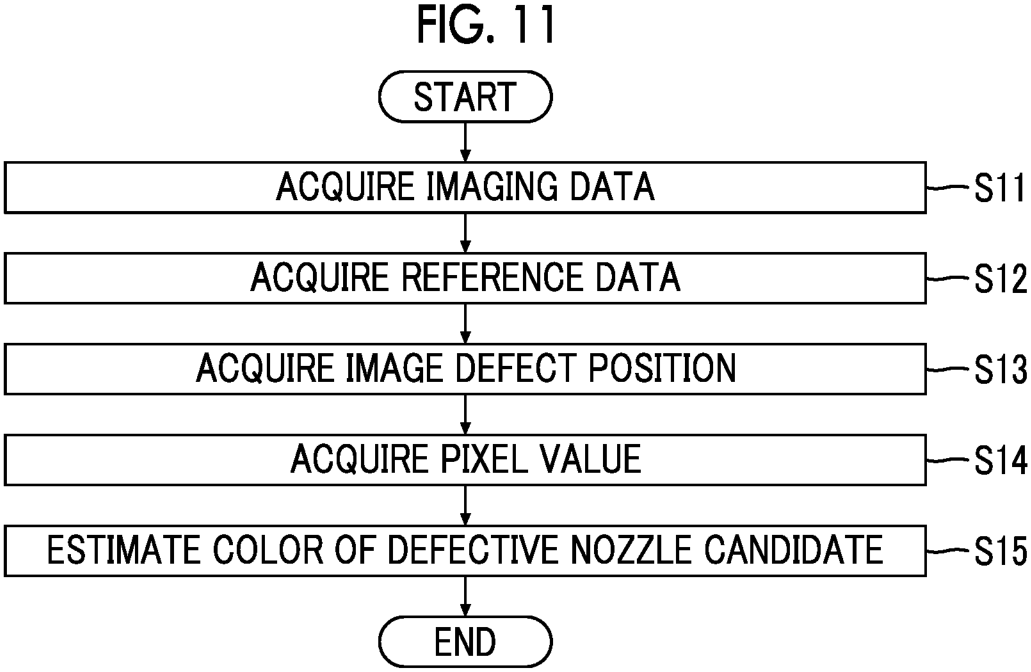
FIG. 11 is a flowchart showing processing of a defective nozzle estimation method by the defective nozzle estimation device.

FIG. 11 is a flowchart showing processing of a defective nozzle estimation method by the defective nozzle estimation device 120.

In step S11, the imaging data acquisition unit 105 of the processor 102 acquires the imaging data based on the captured image in which the printed matter is imaged by the scanner 46 via the integrated control unit 64.

In step S12 (an example of a reference data acquisition step), the reference data acquisition unit 106 acquires the print source data or the reference imaging data as the reference data.

In step S13 (an example of an image defect position acquisition step), the data comparison unit 107 detects the image defect of the printed matter by comparing the imaging data acquired in step S11 with the reference data acquired in step S12. Further, the image defect position acquisition unit 108 acquires the position in the nozzle direction of the image defect of the printed matter caused by the defective nozzle in the imaging data.

In step S14 (an example of a first pixel value acquisition step and an example of a second pixel value acquisition step), the pixel value acquisition unit 126 acquires the amount of variation in the pixel value of the imaging data at the position of the image defect. Here, the pixel value acquisition unit 126 acquires the first pixel value of the imaging data at the position of the image defect and the second pixel value of the reference data of the position corresponding to the position of the image defect, and calculates the amount of variation therebetween.

In step S15 (an example of defective nozzle candidate estimation step), the defective nozzle candidate estimation unit 114 estimates at least one color of the defective nozzle candidate, which is a cause of the image defect of the printed matter, from the amount of variation in the pixel value of the imaging data at the position of the image defect by using the learning model 128. Here, the defective nozzle candidate estimation unit 114 inputs the amount of variation obtained in step S14 and the second pixel value acquired in step S14 to the learning model 128 to estimate the color of the ink of the defective nozzle.

In a case in which printing is performed using seven color inks of black ink, cyan ink, magenta ink, yellow ink, orange ink, green ink, and violet ink as in the present embodiment, it is difficult to narrow down output signals of three channels of RGB of the scanner 46 to one of the seven colors, and there is a problem in that the number of estimation candidates for the ink color of the defective nozzle is increased. On the other hand, according to the present embodiment, the candidates for the color can be narrowed down by using the learning model 128.

In general, as the number of colors increases, it becomes difficult to narrow down the colors of the defective nozzles from the imaging data of a general imaging device in a three-channel format with color components of red, green, and blue, and a complicated algorithm is required. In addition, it is necessary to create an algorithm for each combination of colors to be used, and it takes a lot of time to design and adjust the algorithm.

However, by using the learning model 128 that has been trained by collecting data on the amount of variation in the pixel value in a case in which the nozzle 40 of each color ink is defective, it is possible to significantly reduce the man-hours required for creating the algorithm, and to create an algorithm with a high level of performance.

In addition, in the present embodiment, an example of estimating a color by the learning model 128 is presented, but the estimation may be obtained by color matching by referring to the pixel value of the defect position of the imaging data. For example, in the case in which it is detected that the variation of the blue pixel value among the red, green, and blue pixel values is large, it is possible to narrow down color candidates to three colors of gray, yellow, and orange, because an influence on the blue pixel value is large in a case in which the image defect occurs in the yellow ink system. In addition, of course, the determination may be made based on a plurality of pixel values among the red, green, and blue pixel values. For example, in a case in which there is an influence on all the red, green, and blue pixel values, it is possible to narrow down the color candidates to black and white, and, in a case in which an influence on the red and blue pixel values is dominant, it is possible to narrow down the color candidates to violet.

Further, by performing color matching estimation on the output of the learning model 128, it is possible to accurately estimate the color of the defective nozzle candidate.

Although the channels of the scanner 46 are red, green, and blue here, channels of other colors may be used. In addition, in a case in which a spectrometry camera is used, color estimation can be performed more accurately.

Third Embodiment

The ink jet printing device according to a third embodiment will be described. A common reference numeral is assigned to a portion common to the ink jet printing device 10 according to the first embodiment and the second embodiment, and detailed description thereof will be omitted.

[Defective Nozzle Estimation Device]

The ink jet printing device 10 according to the third embodiment comprises a defective nozzle estimation device 130.

Figure 12:
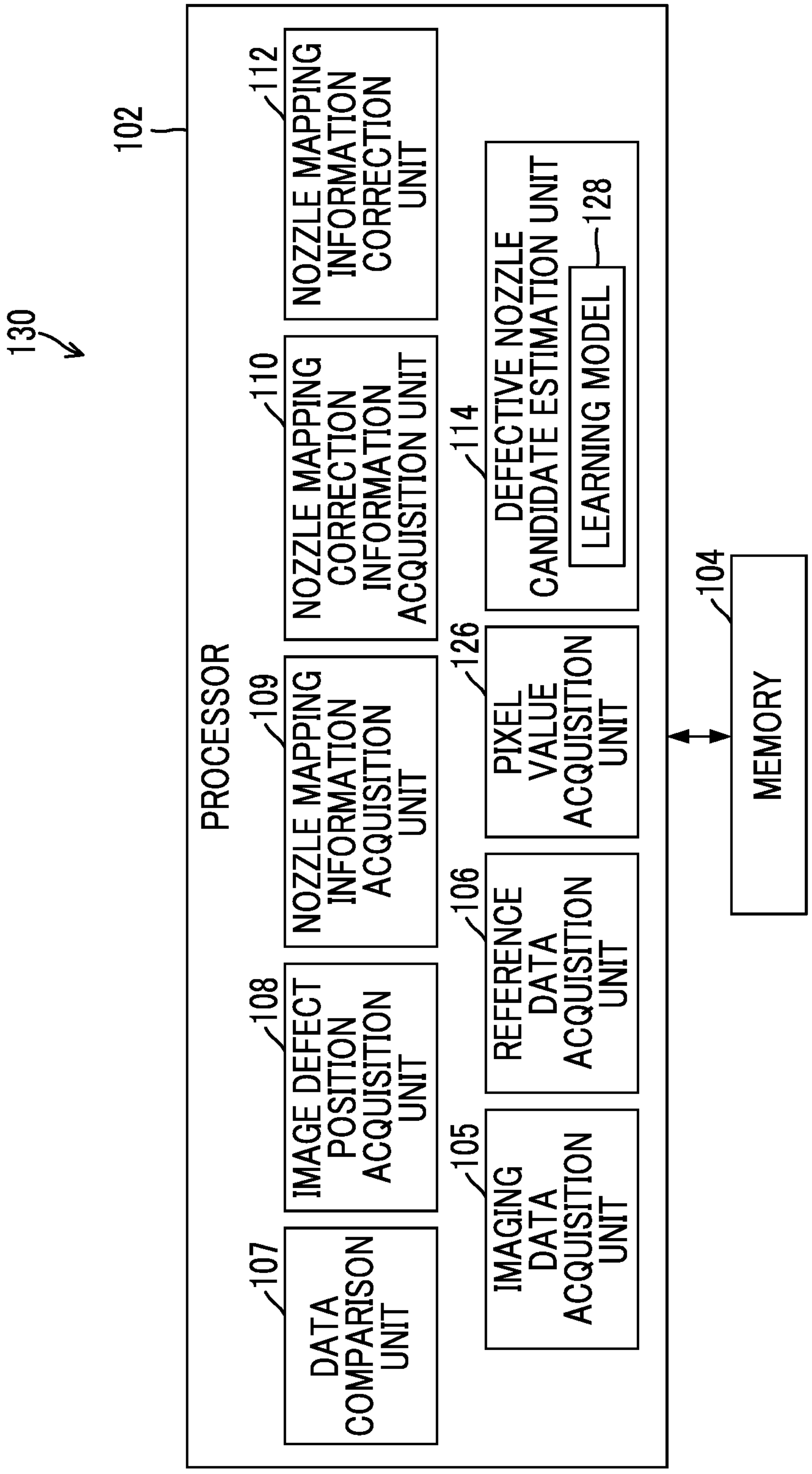
FIG. 12 is a block diagram showing a configuration of a defective nozzle estimation device.

FIG. 12 is a block diagram showing a configuration of the defective nozzle estimation device 130. As shown in FIG. 12, the processor 102 of the defective nozzle estimation device 130 comprises the imaging data acquisition unit 105, the reference data acquisition unit 106, the data comparison unit 107, the image defect position acquisition unit 108, the nozzle mapping information acquisition unit 109, the nozzle mapping correction information acquisition unit 110, the nozzle mapping information correction unit 112, the defective nozzle candidate estimation unit 114, and the pixel value acquisition unit 126. In addition, the defective nozzle candidate estimation unit 114 comprises the learning model 128.

[Defective Nozzle Estimation Method]

Figure 13:
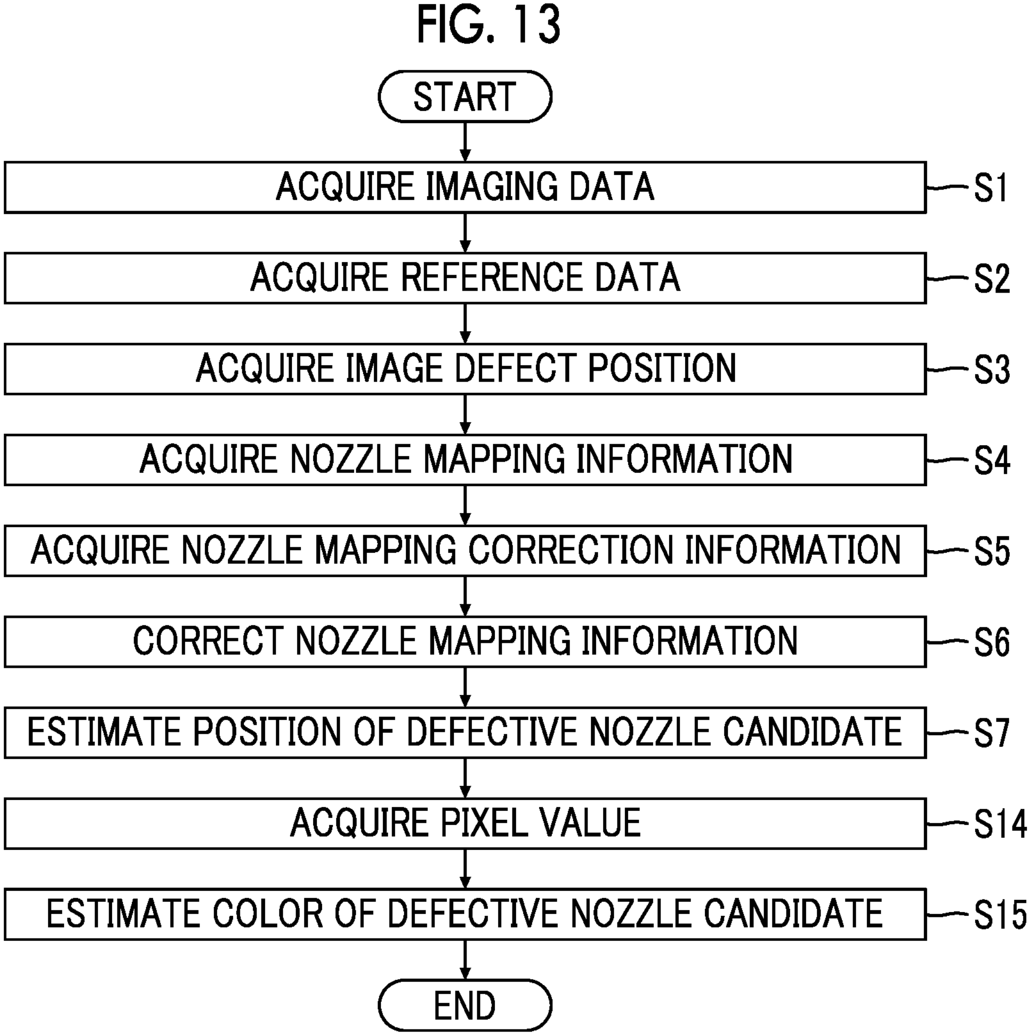
FIG. 13 is a flowchart showing processing of a defective nozzle estimation method by a defective nozzle estimation device.

FIG. 13 is a flowchart showing processing of a defective nozzle estimation method by the defective nozzle estimation device 130.

In FIG. 13, the processes of steps S1 to S7 are the same as those of the first embodiment described with reference to FIG. 9. Through the processes of steps S1 to S7, the position of the defective nozzle candidate in the nozzle direction can be estimated.

In addition, in FIG. 13, the processes of steps S1 to S3 and steps S14 and S15 are the same as those of the second embodiment described with reference to FIG. 11. The color of the defective nozzle candidate can be estimated through the processes of steps S1 to S3 and steps S14 and S15.

As described above, by narrowing down the candidates for the position of the defective nozzle and the candidates for the color, the final defective nozzle candidate can be narrowed down to "the number of nozzle position candidates× the number of color candidates".

Here, the candidate of the nozzle position is estimated for the defective nozzle and then the candidate of the color is estimated, the candidate of the nozzle position may be estimated after estimating the candidate of the color.

Fourth Embodiment

[Method for Manufacturing Printed Matter]

Figure 14:
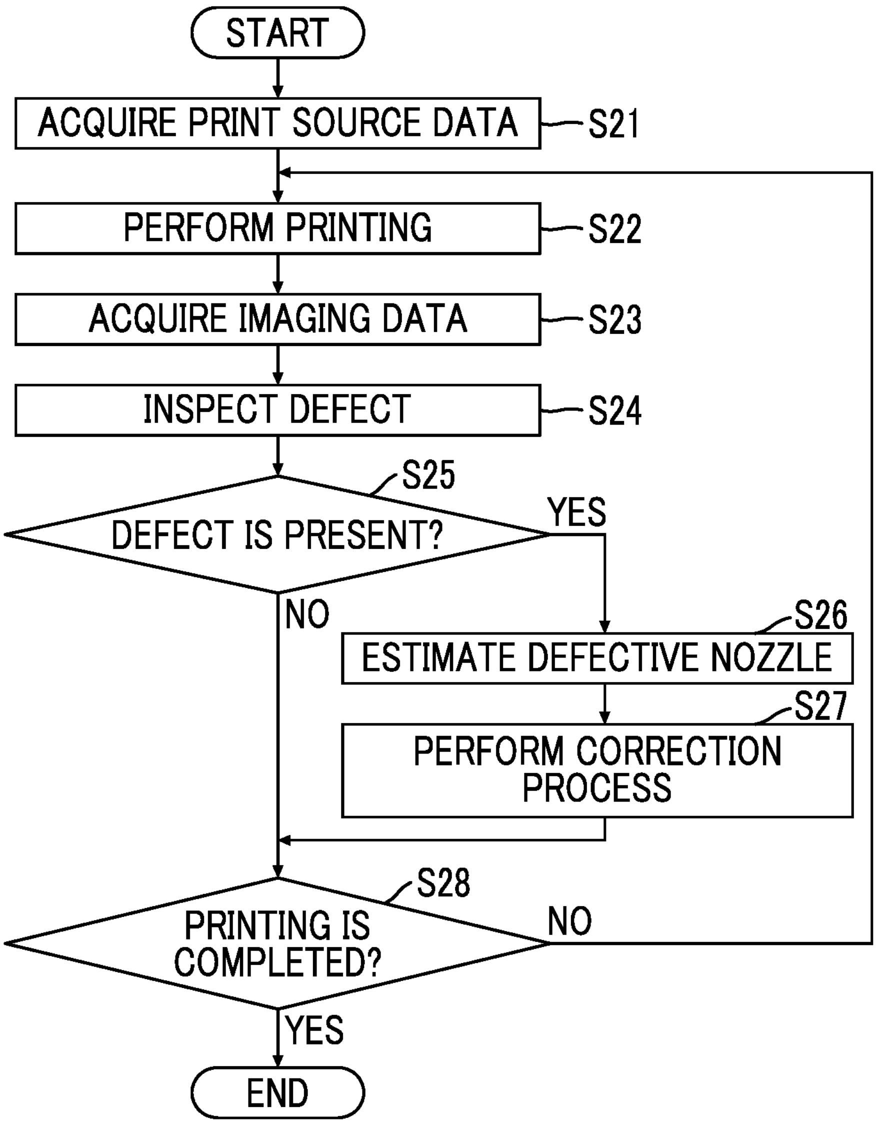
FIG. 14 is a flowchart showing processing of a method for manufacturing a printed matter.

FIG. 14 is a flowchart showing processing of the method for manufacturing the printed matter. The method for manufacturing method the printed matter is stored in the storage unit 62 as a printed matter manufacturing program to be executed by a computer, and is realized by the processor of the integrated control unit 64 executing the printed matter manufacturing program. In the present embodiment, in a case in which a plurality of the estimated defective nozzle candidates are present, an example of specifying the defective nozzle by performing the correction process of suppressing the image defect caused by the defective nozzle candidate is described.

In step S21 (an example of a print source data acquisition step), the integrated control unit 64 acquires the print source data of the printed matter from the storage unit 62.

In step S22 (an example of a printing step), the integrated control unit 64 prints the printed matter based on the print source data acquired in step S1. That is, the image recording control unit 72 jets ink droplets toward the base material 12 from the nozzles 40 of the ink jet heads 36K, 36C, 36M, 36Y, 36O, 36G, and 36V based on the print source data in synchronization with the encoder value acquired via the transport control unit 66.

In step S23 (an example of an imaging data acquisition step), the integrated control unit 64 controls the imaging control unit 76 to acquire the imaging data of the printed matter for which the defect inspection is performed from the scanner 46. That is, the imaging control unit 76 causes the scanner 46 to read the image printed on the base material 12 in synchronization with the encoder value acquired via the transport control unit 66. The imaging data acquisition unit 105 acquires the captured image read by the scanner 46 as the imaging data.

In step S24 (an example of an image defect detection step), the data comparison unit 107 detects an image defect of the printed matter by comparing the imaging data with the print source data. The data comparison unit 107 may detect an image defect of the printed matter by comparing the imaging data with the reference data acquired in advance.

In step S25, the defect inspection device 80 determines whether or not the printed matter has an image defect based on the detection result of step S24.

In a case in which it is determined that the printed matter has an image defect, the ink jet printing device 10 performs the process of step S26. In step S26 (an example of a defective nozzle estimation step), the defective nozzle estimation device 100 estimates the defective nozzle. The estimation of the defective nozzle is performed, for example, by processing the flowchart shown in FIG. 13.

Since the process of step S1 of the flowchart shown in FIG. 13 is the same as the process of step S23 of the flowchart shown in FIG. 14, description thereof may be omitted here. In addition, in a case in which the print source data is used as the reference data, the process of step S2 of the flowchart shown in FIG. 13 is the same as the process of step S21 of the flowchart shown in FIG. 14, so that description thereof may be omitted here.

After the estimation of the defective nozzle is completed, in step S27 (an example of a correction process step), the ink jet printing device 10 performs the correction process on the defective nozzle. Details of the correction process will be described below.

In a case in which it is determined in step S25 that there is no image defect in the printed matter, and in a case in which the correction process is performed in step S27, the process proceeds to step S28. In step S28, the integrated control unit 64 determines whether or not the printing is completed. In a case in which the printing of all the printed matters is completed, the process of the present flowchart ends. In a case in which the printing is continued, the process proceeds to step S22, and the same process is repeated.

[Correction Process]

Figure 15:
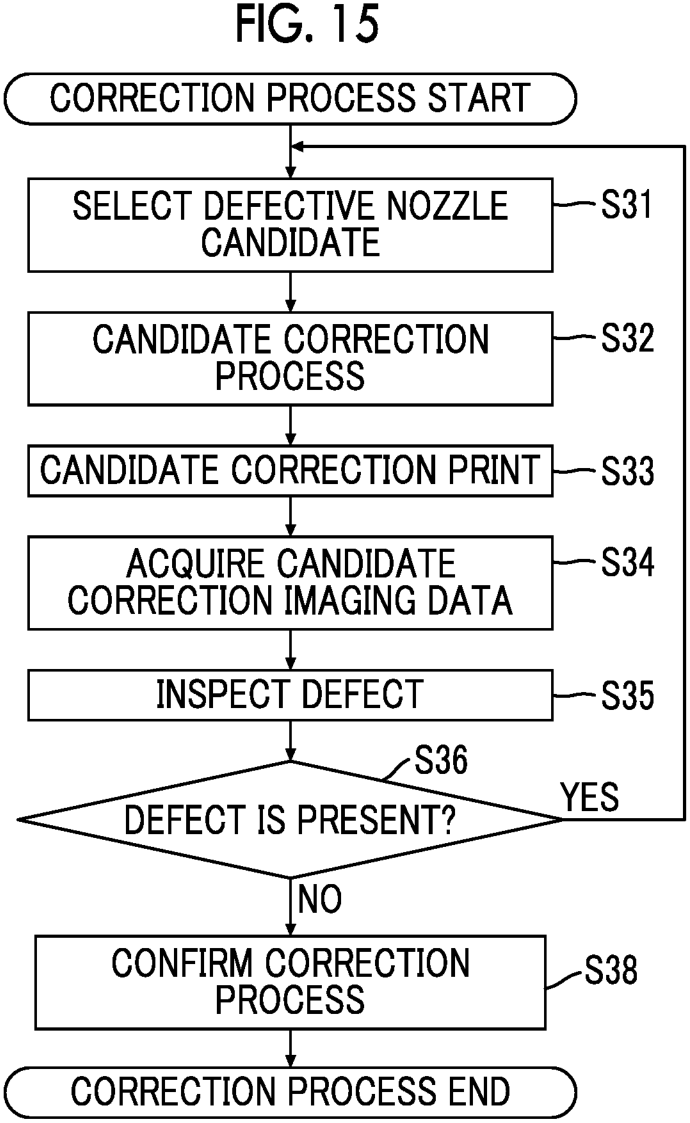
FIG. 15 is a flowchart showing details of a correction process.

FIG. 15 is a flowchart showing the details of the correction process of step S27 of the flowchart shown in FIG. 14.

In step S31, the integrated control unit 64 selects a first defective nozzle candidate, which is at least one of the defective nozzle candidates estimated in step S26.

In step S32, the integrated control unit 64 controls the image recording control unit 72, and generates first corrected print source data that has been subjected to a first correction process of suppressing the image defect caused by the nozzle 40 of the first defective nozzle candidate selected in step S31. The first correction process is, for example, a process of stopping jetting of the ink from the nozzle 40 of the first defective nozzle candidate and increasing the jetting amount of the ink of the nozzle 40 adjacent to the first defective nozzle candidate.

In step S33, the integrated control unit 64 prints a first corrected printed matter using the first corrected print source data on which the first correction process has been performed.

In step S34, the imaging data acquisition unit 105 acquires a first corrected imaging data based on a first corrected captured image obtained by reading the first corrected printed matter printed in step S33 by the scanner 46.

In step S35, the data comparison unit 107 detects the image defect of the first corrected printed matter by comparing the first corrected imaging data acquired in step S34 with the first corrected print source data generated in step S32.

In step S36, the defect inspection device 80 determines the presence or absence of the image defect of the first corrected printed matter. In a case in which it is determined that the first corrected printed matter has an image defect, the process returns to step S31, the integrated control unit 64 selects a second defective nozzle candidate, which is at least one of the defective nozzle candidates estimated in step S26. The second defective nozzle candidate is a defective nozzle candidate different from the first defective nozzle candidate.

In step S32, the integrated control unit 64 controls the image recording control unit 72, and generates second corrected print source data that has been subjected to a second correction process of suppressing the image defect caused by the nozzle 40 of the second defective nozzle candidate selected in step S31. The second correction process is, for example, a process of stopping jetting of the ink from the nozzle 40 of the second defective nozzle candidate and increasing the jetting amount of the ink of the nozzle 40 adjacent to the second defective nozzle candidate. Here, the first defective nozzle candidate is treated as a normal nozzle 40, and the first correction process is not performed.

Hereinafter, the processes of steps S33 to S35 are performed using the second corrected print source data. That is, in step S33, the integrated control unit 64 prints a second corrected printed matter using the second corrected print source data on which the second correction process has been performed. In step S34, the imaging data acquisition unit 105 acquires a second corrected imaging data based on a second corrected captured image obtained by reading the second corrected printed matter printed in step S33 by the scanner 46. In step S35, the data comparison unit 107 detects the image defect of the second corrected printed matter by comparing the second corrected imaging data acquired in step S34 with the second corrected print source data generated in step S32.

Then, in a case in which it is determined in step S36 that the second corrected printed matter has an image defect, the process returns to step S31 again. In step S31, the integrated control unit 64 selects a third defective nozzle candidate, which is at least one of the defective nozzle candidates estimated in step S26 and different from the first defective nozzle candidate and the second defective nozzle candidate. Then, the processes of step S32 to Step S36 are performed on the third defective nozzle candidate. Here, the first defective nozzle candidate and the second defective nozzle candidate are treated as normal nozzles 40, and the first correction process and the second correction process are not performed.

In a case in which it is determined in step S36 that there is no image defect, the process proceeds to step S38. In step S38, the integrated control unit 64 specifies the defective nozzle candidate for which the correction process is being performed at that time point as the defective nozzle, and confirms the correction process. Subsequently, the process proceeds to the process of step S28 of the flowchart shown in FIG. 14. In the printing step of step S22 thereafter, printing is performed using the corrected print source data at that time point.

The processing of this flowchart may be performed in the defective nozzle estimation device 100.

Figure 16:
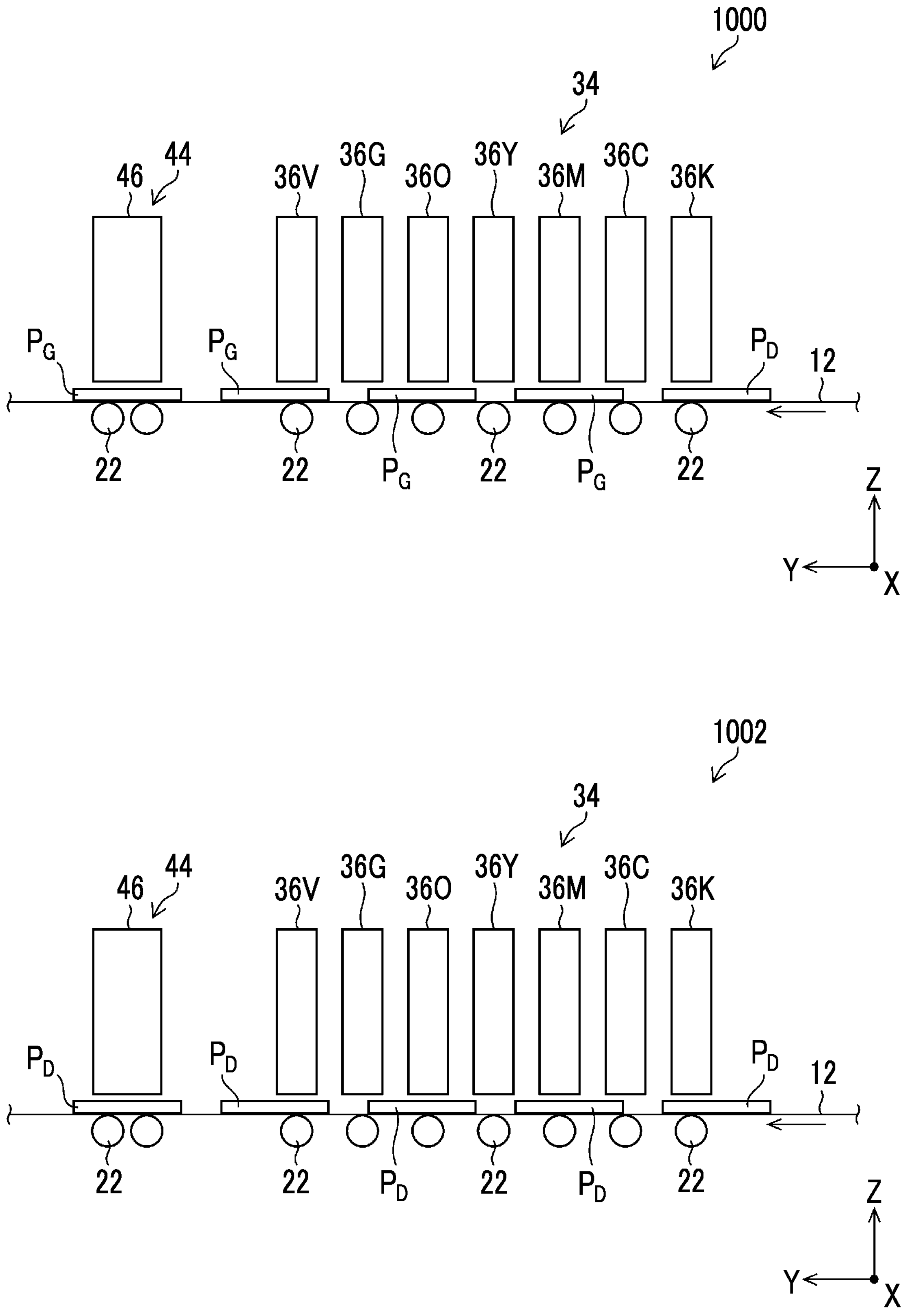
FIG. 16 is a diagram for describing a correction process.
Figure 17:
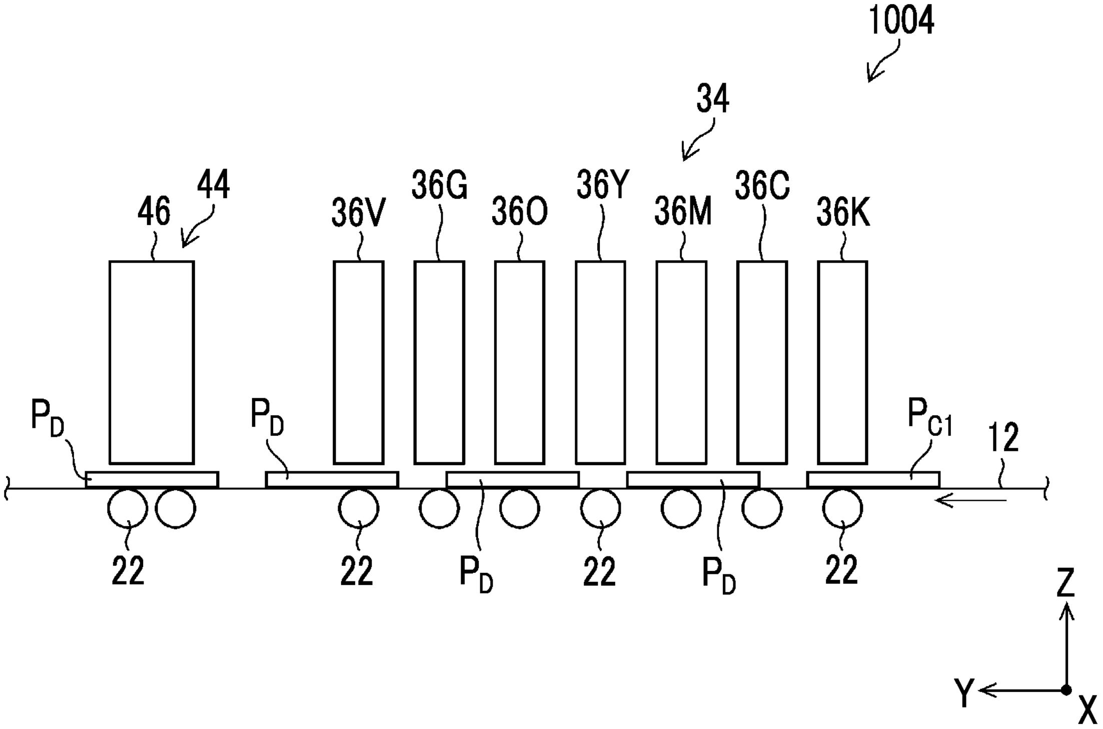
FIG. 17 is a diagram for describing a correction process.
Figure 17:
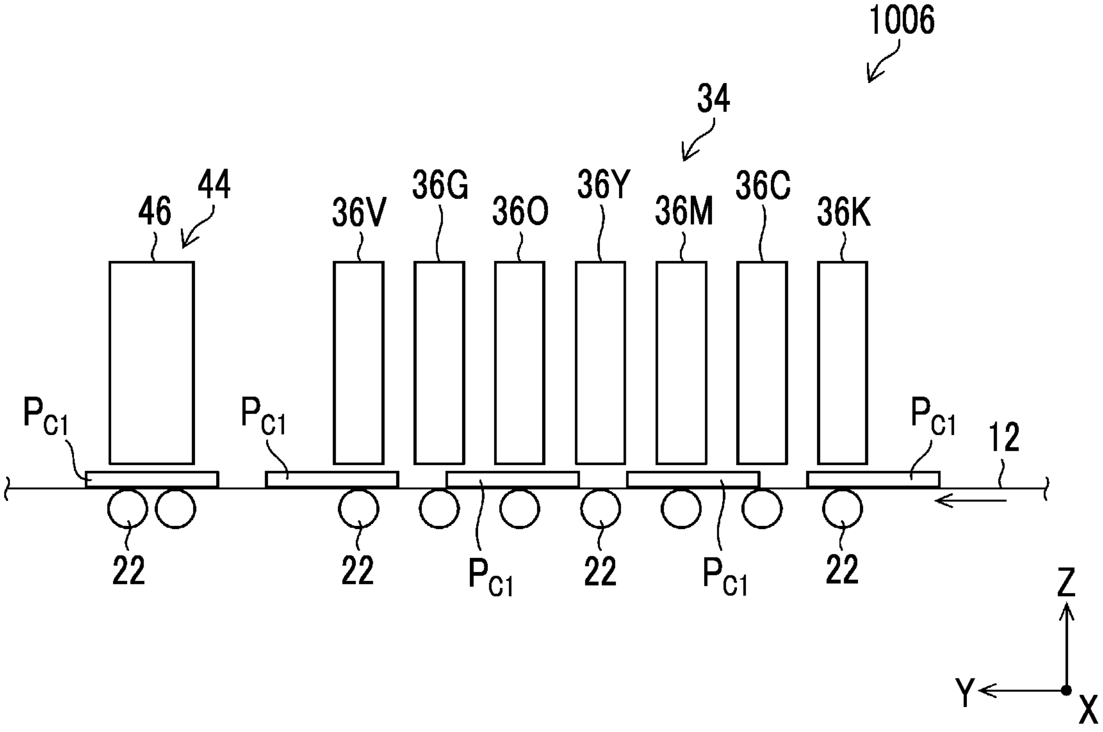
Figure 18:
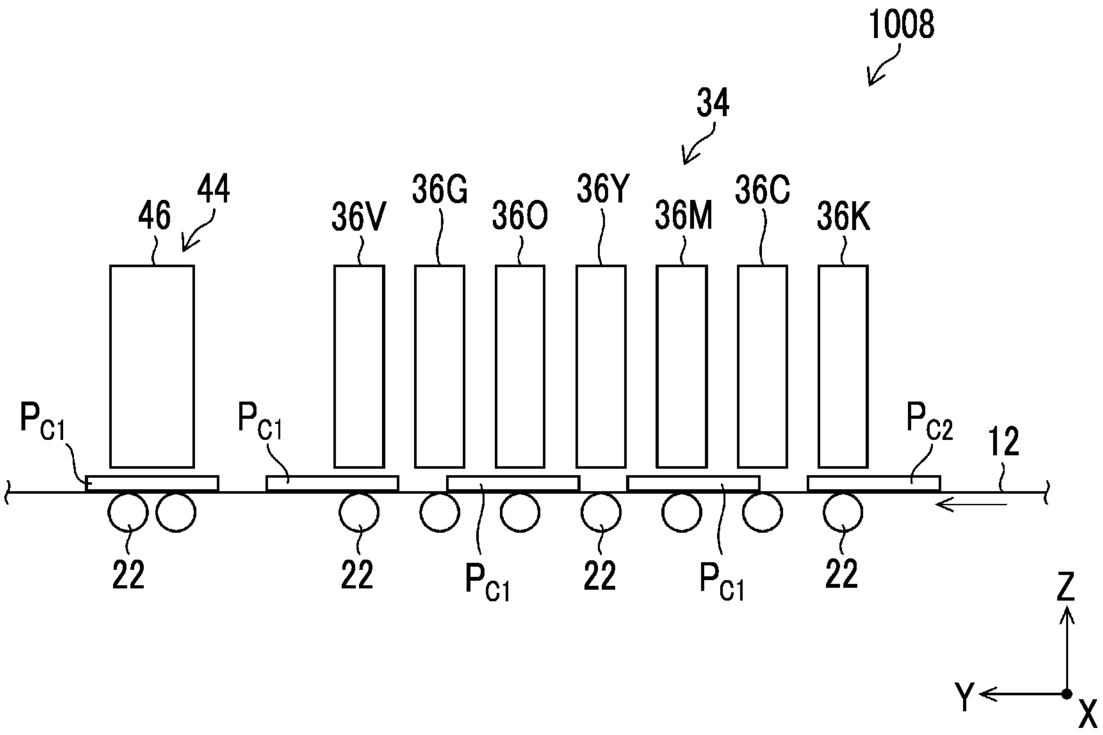
FIG. 18 is a diagram for describing a correction process.
Figure 18:
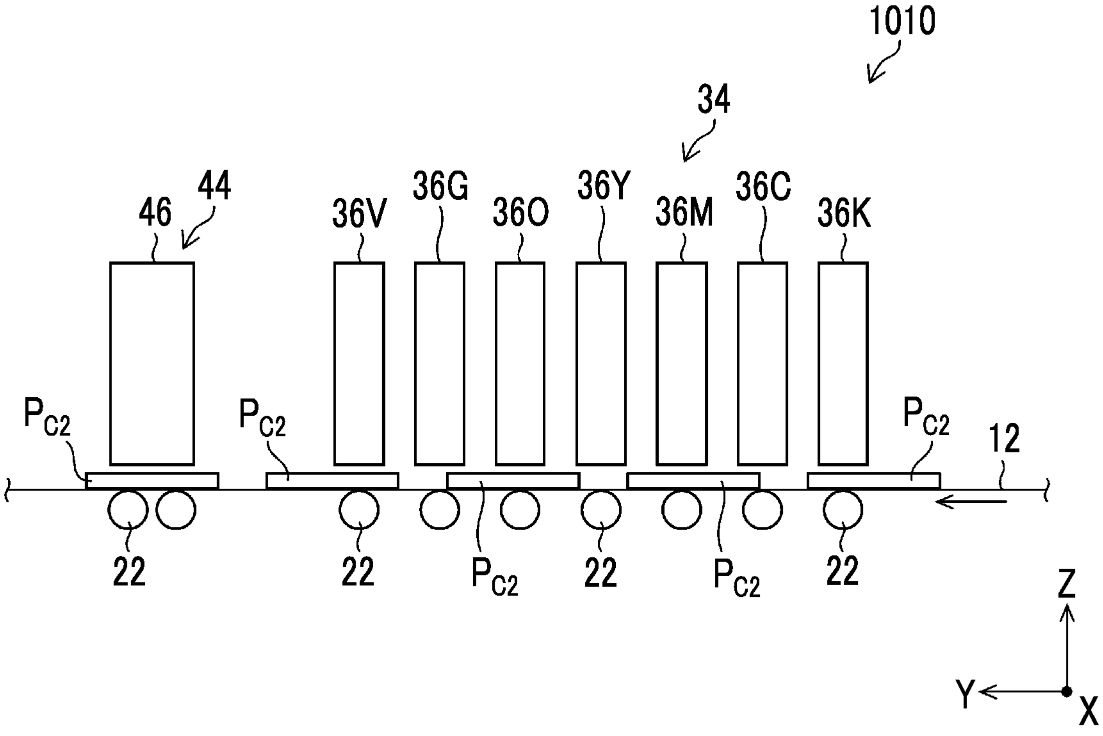

FIGS. 16 to 18 are diagrams for describing the correction process according to a fourth embodiment, and are diagrams showing an outline of the base material 12 that is transported between the image recording section 34 and the imaging section 44.

Reference numeral 1000 shown in FIG. 16 shows a state in which a defective printed matter $P_D$ is generated in the ink jet head 36K. A non-defective printed matter $P_G$ is printed on the base material 12 on the downstream side of the transport path with respect to the defective printed matter $P_D$. Reference numeral 1002 shown in FIG. 16 shows a state in which the defective printed matter $P_D$ generated first reaches the imaging section 44.

Reference numeral 1004 shown in FIG. 17 shows a state in which printing of a first corrected printed matter $P_{C1}$ is started using the first corrected print source data that has been subjected to the first correction process. The defective printed matter P D is printed on the base material 12 on the downstream side of the transport path with respect to the first corrected printed matter $P_{C1}$. Reference numeral 1006 shown in FIG. 17 shows a state in which the first corrected printed matter $P_{C1}$ printed first reaches the imaging section 44.

In a case in which the first corrected printed matter $P_{C1}$ has no image defect, it is specified that the nozzle 40 of the first defective nozzle candidate is a defective nozzle. Therefore, after that, the first corrected printed matter $P_{C1}$ is printed using the first corrected print source data. On the other hand, in a case in which the first corrected printed matter $P_{C1}$ has an image defect, printing of the second corrected printed matter $P_{C2}$ is started using the second corrected print source data that has been subjected to the second correction process.

Reference numeral 1008 shown in FIG. 18 shows a state in which printing of the second corrected printed matter $P_{C2}$ is started. The first corrected printed matter $P_{C1}$ is printed on the base material 12 on the downstream side of the transport path with respect to the second corrected printed matter $P_{C2}$. Reference numeral 1010 shown in FIG. 18 shows a state in which the second corrected printed matter $P_{C2}$ printed first reaches the imaging section 44.

In a case in which the second corrected printed matter $P_{C2}$ has no image defect, it is specified that the nozzle 40 of the second defective nozzle candidate is a defective nozzle. Therefore, after that, the second corrected printed matter $P_{C2}$ is printed using the second corrected print source data. On the other hand, in a case in which the second corrected printed matter $P_{C2}$ has a defect, printing of a third corrected printed matter is started using third corrected print source data that has been subjected to a third correction process. Hereinafter, the correction processes of the nozzles 40 of the defective nozzle candidates are performed in order until a printed matter having no defect is printed.

In a case in which the number of candidates for the defective nozzle is large, it takes a time to correct the correct defective nozzle, and there is a problem in that the number of the base materials 12 which are wastes increases. According to the present embodiment, the image defect is corrected in a case in which the true defective nozzle is corrected, and a normal image is printed by performing the correction processes on the nozzles 40 of the plurality of defective nozzle candidates in order and inspecting the image defect in the corrected printed matter. Therefore, it is possible to specify the defective nozzle candidate that was being corrected in a case in which the image defect disappears in the inspection result as the true defective nozzle. Therefore, it is possible to reduce the waste of the base material 12 until the defective nozzle is corrected.

Fifth Embodiment

[Correction Process]

Figure 19:
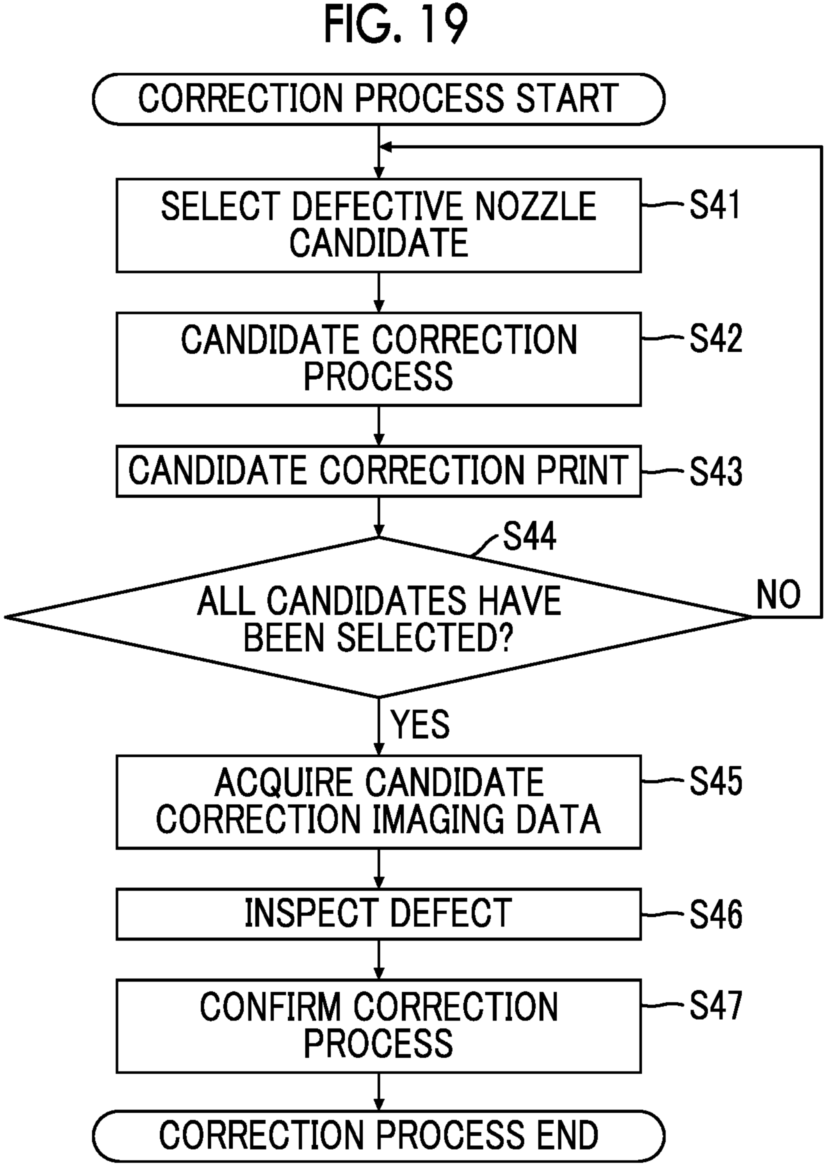
FIG. 19 is a flowchart showing details of a correction process.

FIG. 19 is a flowchart showing the details of the correction process of step S27 of the flowchart shown in FIG. 14.

In step S41, the integrated control unit 64 selects a first defective nozzle candidate, which is at least one of the defective nozzle candidates estimated in step S26.

In step S42, the integrated control unit 64 controls the image recording control unit 72, and generates first corrected print source data that has been subjected to a first correction process of suppressing the image defect caused by the nozzle 40 of the first defective nozzle candidate selected in step S41. As with the fourth embodiment, the first correction process is, for example, a process of stopping jetting of the ink from the nozzle 40 of the first defective nozzle candidate and increasing the jetting amount of the ink of the nozzle 40 adjacent to the first defective nozzle candidate.

In step S43, the integrated control unit 64 prints a first corrected printed matter using the first corrected print source data on which the first correction process has been performed.

In step S44, the integrated control unit 64 determines whether or not all the defective nozzle candidates estimated in step S26 have been selected. In a case in which not all the candidates have been selected, the process returns to step S41, and the same processing is repeated.

That is, the integrated control unit 64 selects a second defective nozzle candidate different from the first defective nozzle candidate in step S41, generates second corrected print source data that has been subjected to a second correction process of suppressing the image defect caused by the nozzle 40 of the second defective nozzle candidate, and prints a second corrected printed matter using the second corrected print source data. Hereinafter, a third defective nozzle candidate, a fourth defective nozzle candidate, . . . , and so on are repeated. In this way, the integrated control unit 64 performs the correction process of suppressing the image defect caused by the defective nozzle candidate selected from the plurality of defective nozzle candidates a plurality of times such that each of the plurality of defective nozzle candidates is selected at least once, and prints the plurality of corrected printed matter using the plurality of pieces of corrected print data obtained by the plurality of times of correction process.

In a case in which it is determined in step S44 that all the defective nozzle candidates have been selected, the process proceeds to step S45. In step S45, the defective nozzle estimation device 100 acquires the first corrected imaging data to the nth corrected imaging data based on the first corrected captured image to the nth corrected captured image obtained by reading the first corrected printed matter, the second corrected printed matter, the third corrected printed matter, . . . , the nth corrected printed matter, which are printed in step S43, by the scanner 46.

In step S46, the defective nozzle estimation device 100 detects the image defects of the first corrected printed matter to the nth corrected printed matter by comparing the first corrected imaging data to the nth corrected imaging data acquired in step S45 with the first corrected print source data to the nth corrected print source data generated in step S42, respectively.

In step S47, the defective nozzle estimation device 100 determines the presence or absence of the image defects of the first corrected printed matter to the nth corrected printed matter, specifies a defective nozzle candidate for which the correction process is being performed on the corrected print source data of the corrected printed matter having no image defect as a defective nozzle, and in the printing step of step S22 thereafter, printing is performed using the corrected print source data.

The processing of this flowchart may be performed in the defect inspection device 80.

Figure 20:
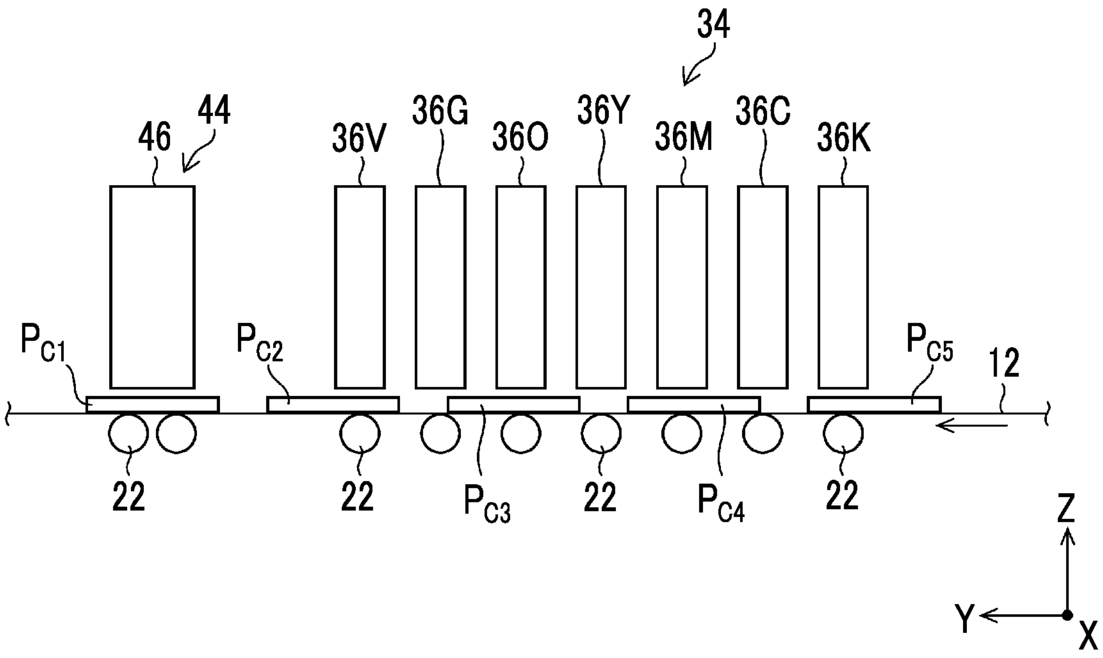
FIG. 20 is a diagram for describing a correction process.

FIG. 20 is a diagram for describing the correction process according to a fifth embodiment, and is a diagram showing an outline of the base material 12 that is transported between the image recording section 34 and the imaging section 44. In FIG. 20, a state is shown in which the first corrected printed matter $P_{C1}$ to the fifth corrected printed matter $P_{C5}$ are printed using the first corrected print source data to the nth corrected print source data that have been subjected to the first correction process to the nth correction process, respectively.

The defective nozzle estimation device 100 can acquire the corrected printed matter having no image defect by inspecting the imaging data obtained by reading the first corrected printed matter $P_{C1}$ to the fifth corrected printed matter $P_{C5}$ in order by the scanner 46.

As described above, the true defective nozzle among the defective nozzle candidates can be specified by printing a plurality of corrected printed matters for which the correction process has been performed at least once for the nozzles 40 of the plurality of defective nozzle candidates and inspecting the image defects of the plurality of corrected printed matters. Therefore, it is possible to reduce the waste of the base material 12 until the defective nozzle is corrected.

Others

Here, an example of a printing device that performs printing on the roll-shaped base material 12 has been described, but the present invention can also be applied to a printing device that performs printing on a sheet-fed print medium.

The technical scope of the present invention is not limited to the scope described in the above-described embodiment. The configurations and the like in each embodiment can be appropriately combined among the respective embodiments without departing from the spirit of the present invention.

EXPLANATION OF REFERENCES

10: ink jet printing device
12: base material

14: sending roll
16: winding roll
20: transport section
22: guide roller
30: treatment liquid application section
32: treatment liquid drying section
34: image recording section
36C: ink jet head
36G: ink jet head
36K: ink jet head
36M: ink jet head
36O: ink jet head
36Y: ink jet head
38: nozzle surface
40: nozzle
42: ink drying section
44: imaging section
46: scanner
48: reading surface
50B: light-receiving element
50G: light-receiving element
50R: light-receiving element
60: user interface
62: storage unit
64: integrated control unit
66: transport control unit
68: treatment liquid application control unit
70: treatment liquid drying control unit
72: image recording control unit
74: ink drying control unit
76: imaging control unit
80: defect inspection device
100: defective nozzle estimation device
102: processor
104: memory
105: imaging data acquisition unit
106: reference data acquisition unit
107: data comparison unit
108: image defect position acquisition unit
109: nozzle mapping information acquisition unit
110: nozzle mapping correction information acquisition unit
112: nozzle mapping information correction unit
114: defective nozzle candidate estimation unit
120: defective nozzle estimation device
126: pixel value acquisition unit
128: learning model
130: defective nozzle estimation device
$D_R$: reference data
$D_{S1}$: imaging data
$D_{S2}$: imaging data
$P_{C1}$ to $P_{C5}$: first corrected printed matter to fifth corrected printed matter
$P_D$: defective printed matter
$P_G$: non-defective printed matter
S1 to S7, S11 to S15: each step of defective nozzle estimation method
S21 to S28: each step of method for manufacturing printed matter
S31 to S38, S41 to S47: each step of correction process

What is claimed is:

1. A defective nozzle estimation device that estimates a defective nozzle of a plurality of ink jet heads of a printing device that prints a printed matter on a print medium by jetting inks from nozzles of the ink jet heads on the basis of print source data, the plurality of ink jet heads jetting inks of different colors from the nozzles, the defective nozzle estimation device comprising:

at least one processor; and at least one memory that stores a command to be executed by the at least one processor, wherein the at least one processor acquires a position of an image defect of the printed matter caused by the defective nozzle in imaging data based on a captured image in which the printed matter is imaged by a scanner, acquires a first pixel value at the position of the image defect of the imaging data, acquires a second pixel value at a position corresponding to the position of the image defect of reference data, which is the print source data or reference imaging data based on a reference captured image in which a reference printed matter is imaged by the scanner, and estimates at least one defective nozzle candidate, which is a cause of the image defect of the printed matter, from the first pixel value and the second pixel value using a learning model.

2. The defective nozzle estimation device according to claim 1, wherein the learning model outputs a color of an ink of the defective nozzle in a case in which an amount of variation between the first pixel value and the second pixel value, and the second pixel value are given as inputs.

3. The defective nozzle estimation device according to claim 1, wherein the at least one processor acquires the first pixel value of imaging data with a plurality of color components based on a captured image with a plurality of color components in which the printed matter is imaged by a scanner having the plurality of color components, calculates an amount of variation between the first pixel value and the second pixel value for each color component, and estimates a color of an ink of the defective nozzle using information on the color component with a largest amount of variation.

4. The defective nozzle estimation device according to claim 1, wherein the plurality of ink jet heads include five or more ink jet heads that jet a black ink, a cyan ink, a magenta ink, a yellow ink, and a special color ink, respectively.

5. The defective nozzle estimation device according to claim 1, wherein the at least one processor acquires first corrected imaging data based on a first corrected captured image in which a first corrected printed matter, which is printed by being subjected to a first correction process of, in a case in which a plurality of the estimated defective nozzle candidates are present, suppressing an image defect caused by a first defective nozzle candidate that is at least one of the plurality of defective nozzle candidates, is imaged by the scanner, and determines whether or not the first defective nozzle candidate is a defective nozzle based on the first corrected imaging data.

6. The defective nozzle estimation device according to claim 5, wherein the at least one processor acquires second corrected imaging data based on a second corrected captured image in which a second corrected printed matter, which is printed by being subjected to a second correction process of, in a case in which it is determined that the first defective nozzle candidate is not a defective nozzle, suppressing an image defect caused by a second defective nozzle candidate that is at least one of the plurality of defective nozzle candidates and is different from the first defective nozzle candidate, is imaged by the scanner, and determines whether or not the second defective nozzle candidate is a defective nozzle based on the second corrected imaging data.

7. The defective nozzle estimation device according to claim 1, wherein, in a case in which a plurality of the estimated defective nozzle candidates are present, the at least one processor performs a correction process of suppressing an image defect caused by a defective nozzle candidate selected from the plurality of defective nozzle candidates a plurality of times such that each of the plurality of defective nozzle candidates is selected at least once, acquires a plurality of pieces of corrected imaging data based on a plurality of corrected captured images in which a plurality of corrected printed matters printed using a plurality of pieces of corrected print data obtained by the plurality of times of correction process are imaged by the scanner, and determines whether or not each of the plurality of defective nozzle candidates is a defective nozzle based on the plurality of pieces of corrected imaging data.

8. The defective nozzle estimation device according to claim 1, wherein, in each of the plurality of ink jet heads, a plurality of nozzles are disposed in a nozzle direction, the printing device is a single-pass type printing device which includes a scanner in which a plurality of reading pixels are disposed in the nozzle direction, and a relative movement mechanism for moving the plurality of ink jet heads and the scanner, and the print medium relative to each other in a relative movement direction intersecting the nozzle direction, and which prints the printed matter on the print medium relatively moved in the relative movement direction by jetting inks from the nozzles of the ink jet heads onto the print medium on the basis of the print source data and reads the printed matter with the reading pixels of the scanner, and the at least one processor acquires nozzle mapping information indicating a correspondence relationship between positions of a plurality of nozzles of at least a first ink jet head among the plurality of ink jet heads and pixel positions of the imaging data in the nozzle direction, acquires nozzle mapping correction information for correcting a positional relationship between at least two of the print medium, the first ink jet head, and the scanner in the nozzle direction, corrects the nozzle mapping information using the nozzle mapping correction information, and estimates at least one defective nozzle candidate, which is the cause of the image defect of the printed matter, using the corrected nozzle mapping information.

9. A printing device comprising:

the defective nozzle estimation device according to claim 1;

the plurality of ink jet heads that jet inks of different colors from the nozzles; and a relative movement mechanism for moving the plurality of ink jet heads and the print medium relative to each other, wherein the printing device prints the printed matter on the relatively moved print medium by jetting inks from the nozzles of the plurality of ink jet heads onto the print medium on the basis of the print source data.

10. A defective nozzle estimation method of estimating a defective nozzle of a plurality of ink jet heads of a printing device that prints a printed matter on a print medium by jetting inks from nozzles of the ink jet heads on the basis of print source data, the plurality of ink jet heads jetting inks of different colors from the nozzles, the defective nozzle estimation method comprising:

an image defect position acquisition step of acquiring a position of an image defect of the printed matter caused by the defective nozzle in imaging data based on a captured image in which the printed matter is imaged by a scanner;

a first pixel value acquisition step of acquiring a first pixel value at the position of the image defect of the imaging data;

a second pixel value acquisition step of acquiring a second pixel value at a position corresponding to the position of the image defect of reference data, which is the print source data or reference imaging data based on a reference captured image in which a reference printed matter is imaged by the scanner; and a defective nozzle candidate estimation step of estimating at least one defective nozzle candidate, which is a cause of the image defect of the printed matter, from the first pixel value and the second pixel value using a learning model.

11. A method for manufacturing a printed matter, the method comprising:

a printing step of, via a printing device that prints a printed matter on a print medium by jetting inks from nozzles of a plurality of ink jet heads that jet inks of different colors from the nozzles on the basis of print source data, printing the printed matter on the print medium by jetting inks from the nozzles of the plurality of ink jet heads onto the print medium on the basis of the print source data;

an imaging data acquisition step of acquiring imaging data based on a captured image in which the printed matter is imaged by a scanner;

a reference data acquisition step of acquiring reference data, which is the print source data or reference imaging data based on a reference captured image in which a reference printed matter is imaged by the scanner;

an image defect detection step of detecting an image defect of the printed matter on the basis of the imaging data;

the defective nozzle estimation method according to claim 10; and a correction process step of performing a correction process of suppressing the image defect caused by the at least one defective nozzle candidate with respect to the print source data.

12. A non-transitory, computer-readable tangible recording medium on which a program for causing, when read by a computer, the computer to execute the defective nozzle estimation method according to claim 10 is recorded.

* * * * *